US009473827B2

(12) United States Patent
Ladd et al.

(10) Patent No.: US 9,473,827 B2
(45) Date of Patent: Oct. 18, 2016

(54) APPARATUS AND METHODS FOR IMPLEMENTATION OF NETWORK SOFTWARE INTERFACES

(75) Inventors: Patrick Ladd, San Marcos, CA (US); George W. Sarosi, Charlotte, NC (US); William Helms, Longmont, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 305 days.

(21) Appl. No.: 13/493,740

(22) Filed: Jun. 11, 2012

(65) Prior Publication Data
US 2012/0311023 A1    Dec. 6, 2012

Related U.S. Application Data

(63) Continuation of application No. 10/883,374, filed on Jun. 30, 2004, now Pat. No. 8,201,191.

(51) Int. Cl.
H04N 21/81         (2011.01)
H04L 29/06         (2006.01)
H04N 21/443        (2011.01)

(52) U.S. Cl.
CPC ............ H04N 21/818 (2013.01); H04L 63/10 (2013.01); H04L 63/168 (2013.01); H04N 21/4431 (2013.01)

(58) Field of Classification Search
CPC  H04N 21/818; H04N 21/4431; H04L 63/10; H04L 63/168
See application file for complete search history.

(56) References Cited

U.S. PATENT DOCUMENTS

| | | | |
|---|---|---|---|
| 6,101,607 A | 8/2000 | Bachand et al. | |
| 6,408,342 B1 | 6/2002 | Moore et al. | |
| 6,543,050 B1 | 4/2003 | Letellier et al. | |
| 6,694,511 B1* | 2/2004 | Yokote .................. | G06F 9/445 709/203 |
| 6,704,804 B1 | 3/2004 | Wilson et al. | |
| 6,725,285 B2 | 4/2004 | Van De Meulenhof et al. | |
| 6,728,963 B1 | 4/2004 | Forin et al. | |
| 6,757,745 B1 | 6/2004 | Hamann et al. | |
| 6,948,183 B1* | 9/2005 | Peterka ............................ | 725/25 |
| 7,206,853 B2* | 4/2007 | Eytchison et al. ............ | 709/230 |
| 7,231,411 B1* | 6/2007 | Lu ...................... | G06Q 20/3552 |
| 7,346,912 B2 | 3/2008 | Seebaldt | |
| 7,487,534 B1* | 2/2009 | Peterka et al. ................ | 725/131 |

(Continued)

Primary Examiner — Charles E Anya
(74) Attorney, Agent, or Firm — Gazdzinski & Associates, PC

(57) ABSTRACT

Apparatus and methods for improved software programming interface functionality in a network. In one exemplary embodiment, the network comprises an HFC cable network with CPE in which network-specific programming interfaces (e.g., APIs) may be downloaded to the CPE, registered, authenticated, stored and executed in a software protocol stack implementing OpenCable Application Platform (OCAP) or Multimedia Home Platform (MHP) standards. The host device software comprises a "manager" module that registers APIs identified by the OCAP Monitor Application, such that all applications launched thereafter on the device can use these communications APIs, provided they have the appropriate permission(s). This relieves individual applications from having to support details regarding network-specific protocols and APIs. In an alternate embodiment, class and data files associated with the API functionality are downloaded along with an application. The downloaded application registers the API using a modified version of the API using a description file (DF). The DF describes the class and data files provided with the application that are part of the registered API.

21 Claims, 10 Drawing Sheets

(56) References Cited

U.S. PATENT DOCUMENTS

| | | |
|---|---|---|
| 7,490,346 B2 | 2/2009 | Alao et al. |
| 7,573,899 B2 | 8/2009 | Bouat |
| 2002/0059619 A1 | 5/2002 | Lebar |
| 2002/0100059 A1* | 7/2002 | Buehl et al. ............... 725/116 |
| 2003/0182429 A1* | 9/2003 | Jagels ........................ 709/227 |
| 2003/0217369 A1 | 11/2003 | Heredia |
| 2004/0003400 A1 | 1/2004 | Carney et al. |
| 2004/0117817 A1 | 6/2004 | Kwon et al. |
| 2004/0139480 A1* | 7/2004 | Delpuch et al. ........... 725/135 |
| 2004/0226049 A1* | 11/2004 | Shiomi ........................ 725/131 |
| 2004/0226051 A1 | 11/2004 | Carney et al. |
| 2005/0028155 A1 | 2/2005 | Jung |
| 2005/0044201 A1 | 2/2005 | Suzuki et al. |
| 2005/0071427 A1 | 3/2005 | Dorner et al. |
| 2005/0138401 A1 | 6/2005 | Terao et al. |
| 2005/0144635 A1 | 6/2005 | Boortz |
| 2005/0149478 A1 | 7/2005 | Fahy |
| 2005/0155057 A1 | 7/2005 | Wei |
| 2005/0204391 A1 | 9/2005 | Hunleth et al. |
| 2005/0270423 A1 | 12/2005 | Matsunaga |

\* cited by examiner

APPARATUS AND METHODS FOR IMPLEMENTATION OF NETWORK SOFTWARE INTERFACES

PRIORITY

This application is a continuation of and claims priority to U.S. patent application Ser. No. 10/883,374 filed Jun. 30, 2004 of the same title, now issued as U.S. Pat. No. 8,201, 191, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of software applications used on an information network (such as for example a cable television network), and specifically to flexible methods and apparatus for providing programming interfaces across a variety of different network configurations and protocols.

2. Description of Related Technology

Digital TV (DTV) is an emerging technology which utilizes digitized and compressed data formats (e.g., MPEG) for content transmission, as compared to earlier analog "uncompressed" approaches (e.g., NTSC). The DTV content may be distributed across any number of different types of bearer media or networks with sufficient bandwidth, including Hybrid Fiber Coaxial (HFC), satellite, wireless, or terrestrial.

Interactivity is a key feature offered by DTV. Interactive applications enhance viewer experience beyond the simple "watch-TV" experience historically provided by analog television transmission networks. Various standards have been defined in the interactive television (ITV) industry that specify how various interactive applications are created, the software modules are transmitted with television programs, received and presented to the viewer by the Consumer Premise Equipment (CPE).

DTV standards such as the OpenCable Application Platform (OCAP) middleware specification (e.g., Version 1.0, and recently released Version 2.0) require that applications be downloaded to CPE from the bearer or broadcast network in real-time. The OCAP specification is a middleware software layer specification intended to enable the developers of interactive television services and applications to design such products so that they will run successfully on any cable television system in North America, independent of set-top or television receiver hardware or operating system software choices.

As is well known, middleware generally comprises one or more layers of software which are positioned "between" application programs and the lower or physical layers of the network device. Middleware is commonly written for the specific requirements of the operator of the computer system, and the proprietary software purchased by the operator of the computer system. A key role of middleware is to insulate the application programs from the device specific details. By using middleware the application programmers need know very little about the actual network details, since they can rely on the middleware to address the complexities of interfacing with the network.

In the context of cable television networks, Video-on-Demand (VOD) is an example of a commercially important ITV application. This application is also a good example of an ITV application that requires software components that implement communications protocol specific to a cable network for interaction with a VOD server on the network side (e.g. at a cable headend). For example, in networks that use equipment from Motorola (previously General Instrument), APIs supporting DigiCipher™ network will be implemented. Similarly, in a cable network that is based on Scientific Atlanta's PowerKey™ Conditional Access system, APIs specific to that system will be used.

In general, a network-specific protocol is a protocol or method that is used to provide cable services that may or may not be based on a standard. The protocol tends to be different between cable operators. Other examples of network specific protocols include (but are not limited to) those used to support on-demand interactive session setup, video stream control, and pay-per-view (PPV) services.

Even with the separation of conditional access hardware from the video and audio decoding hardware on the typical digital receiver (as described for example in the CableCard specification), there are still network specific protocols that must be abstracted below the application layer, but above the middleware implementation.

Various methods are used in ITV applications to implement network specific protocols. In the OCAP context, two primary methods are employed to address these issues. The first method specifies a standard API interface to abstract the specific protocols, and requires that every implementation support this interface. One salient problem with this method is that when a consumer obtains the CPE from a retail store or similar source, the CPE has no knowledge of the network to which it will be attached, and is hence unable to implement the correct protocol(s) for that network.

The second method requires the application to implement the defined protocol within the scope of the application itself. This method requires the application developer to be familiar with all of the different protocols, and to produce multiple versions of the application for the different networks in which the application will be used. Additionally, for multiple applications to access these services, it would be necessary for each application to implement the same protocols, which is a significant waste of the limited resources of the CPE.

A number of other approaches to software and interface management are present in the prior art. Specifically, U.S. Pat. No. 6,728,963 to Forin, et al, issued Apr. 27, 2004 and entitled, "Highly componentized system architecture with a loadable interprocess communications manager" discloses a loadable interprocess communication manager and generally a computer operating system capable of supporting plural threads running in a computer having a working memory. The computer operating system includes a kernel resident in the working memory at link time and a loadable interprocess communication manager (resident at link time outside of the working memory and dynamically loadable into the working memory at run time upon request by one of the threads in one address space to communicate with an other thread in an other address space). The kernel includes a loader for loading the interprocess communication manager into the working memory in response to the request by the one thread. The computer further includes a storage memory separate from the working memory, the loadable interprocess communication manager residing at link time in the storage memory. The loader loads the interprocess communication manager from the storage memory to the working memory. The loadable interprocess communication manager is terminable from the working memory upon lack of a need for communication between threads in different address spaces.

U.S. Pat. No. 6,725,285 to Van De Muelenof, et al, issued Apr. 20, 2004 and entitled, "Communication system, controlling device and controlled device" discloses a communication system having a controlled device for which an abstract representation (AR) is provided as an interface on a controlling device. When the quality of the connection between the controlling device and the controlled device drops below a predetermined level, or if some similar criterion is met, the system selects a second controlling device which is better suited for controlling the controlled device, and generates a migration event to indicate this. The first controlling device transfers control over the controlled device to the second controlling device when it receives said migration event. This can be done by uploading the AR to the second controlling device, possibly supplemented with the current state of the AR to perforin a transparent transfer.

U.S. Pat. No. 6,704,804 to Wilson, et al, issued Mar. 9, 2004 and entitled, "Method and system for communicating information among interactive applications" describes a group of protocols that establishes an information bus. The protocols allow various applications and components to plug into the information bus. As a member of the bus, each application or component can exchange information with any other application or component in a structured manner. The information bus is especially useful in interconnecting Java beans and applets in a Java virtual machine (VM) and in a distributive computer environment.

U.S. Pat. No. 6,543,050 to Letellier, et al, issued Apr. 1, 2003 and entitled, "Method and apparatus for enlarging DVB-CI functionality by enabling a direct access to the conditional access module" discloses apparatus and methods used in the Digital Video Broadcasting-Common Interface environment for accessing the Conditional Access Module (CAM). The host application handles objects of the Conditional Access (CA) through a private API. Each CAM may have its own private CA API, but the data channel remains identical irrespective of the CAM. This new mode coexists with two defined modes: (i) a low level Man-Machine Interface, and (ii) a high level Man-Machine Interface. If a set-top unit "understands" the private CA API, then it may access the features of the plugged CA through its private CA API Protocol. Otherwise, it remains on the standard API. With this extension, a set-top unit can have a Conditional Access user interface (UI) which fits into the overall UI of the unit. Thus, a broadcaster can ensure that its "look and feel" are respected on its set-top units. A manufacturer can build a set-top unit especially optimized for one or more CAs yet which is still able to run other CAs.

U.S. Pat. No. 6,408,342 to Moore, et al, issued Jun. 18, 2002 and entitled, "Communications framework for supporting multiple simultaneous communications protocols in a distributed object environment" discloses a communication framework supporting multiple communications protocols. The communications framework includes a remote procedure call class providing an interface for an "apply" method, the apply method referencing a remote object, an operation to be performed, and an argument list. The communications framework also has at least one remote procedure call transport deriving from the remote procedure call class; each remote procedure call transport provides an implementation for the apply method whose interface is provided by the remote procedure call class.

Despite the variety of techniques described above, the prior art does not disclose apparatus or methods to efficiently implement application software (such as that useful for ITV applications) that can be adapted to work on any network-specific communication protocol. This deficiency is particularly acute with respect to the HFC networks where different proprietary protocols exist for OOB communication with the head-end, and for certain Conditional Access functions. Accordingly, there is a need for an architecture and methods that enable registration of APIs, and provide mechanisms for applications to identify and use the appropriate APIs in any communications network regardless of its particular protocol(s). Such methods and apparatus would ideally simplify application development by eliminating the need to generate code to take into account all possible network protocols, thereby reducing host device CPU and memory requirements. Such methods and apparatus would also ideally provide software applications access to on-demand and encrypted services without having to know the details of the network specific protocol.

SUMMARY OF THE INVENTION

The present invention addresses the foregoing needs by providing an improved methods and apparatus for operating network software.

In a first aspect of the invention, a method of operating client equipment having at least one application associated therewith in a content-based network is disclosed. The method generally comprises: providing a manager module adapted to manage a plurality of network-specific interfaces; registering at least one programming interface specific to said content-based network using said module; running said at least one application; and based at least in part on said registration, accessing said at least one programming interface with said application. In one exemplary embodiment, the network comprises a cable network and the client equipment a set-top box or similar device adapted for residential use. The manager module is installed on the client equipment (whether via download, installation at manufacture, or otherwise), and used to interface with the applications also running on the client equipment. The manager module in effect acts as a central access point for network-specific programming interfaces and/or protocols, thereby relieving each of the applications from having to contain functionality directed to these network-specific aspects.

In a second aspect of the invention, a method of providing access to network-specific programming interfaces (e.g., APIs) within CPE in a cable network is disclosed. In one exemplary embodiment, the CPE comprises a Java-based software environment and a plurality of applications which are precluded from accessing each other's class files or instantiated objects. The method comprises: providing an API manager within said CPE environment; providing a registry associated with said manager, said registry adapted to register a plurality of network-specific APIs; running at least one of said plurality of applications on said CPE, at least one of said APIs being required by said at least one application; and accessing said registry to obtain said at least one API.

In a third aspect of the invention, an improved storage device for use in a network is disclosed. The storage device generally comprises a medium adapted to store a plurality of data bits thereon, said data bits comprising a computer program, said computer program comprising an interface manager program, said interface manager adapted to run on a digital processor and further to: register one or more network-specific APIs within an associated registry; and interface with one or more applications requesting access to said APIs. In one exemplary embodiment, the storage device comprises RAM or a mass storage device (e.g., HDD) within or associated with OCAP-compliant CPE. The computer program operates with the OCAP middleware and provides API management functions including centralized access, thereby allowing the applications distributed to the CPE to be "thinner" and also more generic; i.e., useful across multiple heterogeneous networks.

In a fourth aspect of the invention, improved CPE adapted for operation within a first cable network is disclosed. In one embodiment, the CPE comprises: an application which is substantially generic across a plurality of different networks; a manager module resident within a protocol stack of said CPE, said manager module being adapted to register APIs adapted for use within said first network; wherein said application can query said protocol stack for one or more of said APIs in order to communicate with another entity associated with said first network. In another embodiment, the CPE comprises: a processor; a storage device operatively coupled to said processor; a monitor application running on said processor and adapted to control at least one function within said apparatus; an API manager adapted to manage one or more APIs; and at least one software application adapted to run on said processor; wherein said apparatus is configured to: (i) download at least one API from said first network; and (ii) selectively provide access to said API by said at least one software application using at least said manager.

In a fifth aspect of the invention, a method of operating a cable network having a plurality of client devices operatively coupled thereto is disclosed, the method generally comprising: providing an on-demand or conditional access capability within said network; providing an API manager on each of said plurality of devices; providing at least one on-demand or conditional access-related application for use on each of said devices; providing at least one network-specific API to each of said devices; and accessing said on-demand or conditional access capability from at least one of said client devices using said at least one application and said at least one API, said API manager controlling access to said API by said application.

In a sixth aspect of the invention, improved CPE for use in a network is disclosed. In one embodiment, the CPE comprises an OCAP-compliant device which is adapted to implement an API registration functionality, specifically comprising: receiving at least one application; receiving a plurality of files associated with the at least one application; and registering the API based at least in part on information contained within the plurality of files. The files comprise class and data files that describe the classes associated with the API. The CPE is adapted to generate one or more classloaders upon signaling of the application with a descriptor in order to provide access to the shared classes of the registered API. The descriptor contains the name of the registered API(s) that the application is requesting access to.

In a seventh aspect of the invention, a software architecture adapted for use in a cable network is disclosed, the architecture generally comprising: at least one software application having substantially all network-specific programming interfaces and protocols abstracted therefrom; at least one network-specific programming interface; and at least one manager entity, said manager entity being adapted to run within the same software environment as said at least one interface and application, said manager entity registering said at least one interface and providing access thereto by said application.

In an eighth aspect of the invention, a method of conducting business over a network having at least one server adapted to interface directly or indirectly with a plurality of client devices is disclosed. In one embodiment, said method comprises: providing the ability to utilize selectively or conditionally accessible services over said network to a plurality of said users; distributing to at least some of said users a manager module adapted to interface with a plurality of applications, at least one of said applications relating to said services; providing at least one network-specific API adapted for use in providing said services; and providing said services to said client devices using at least said manager module, said at least one network-specific API, and said at least one application.

In a ninth aspect of the invention, a method of operating first and second networks so as to be able to use a common application in both is disclosed. The method generally comprises: providing substantially identical versions of an application from which substantially all network-specific functionality has been abstracted to client devices in each of said first and second networks; providing first and second network-specific functional entities to client devices within said first and second networks, respectively, said first and second functional entities each being adapted to provide at least in part said network-specific functionality relevant to said first and second networks, respectively; providing an entity manager to said client devices of said first and second networks, said entity manager adapted to interface with said application and the respective ones of said first and second functional entities; and operating said application on the client devices of said first and second networks, said application and manager of said client devices within said first network cooperating to access said first network specific functional entities, said application and manager of said client devices within said second network cooperating to access said second network specific functional entities. In one exemplary embodiment, the networks comprise heterogeneous cable networks owned and operated by the same entity, each network having specific APIs and/or protocols which are required to support services such as VOD. A common version of the application is developed which has abstracted out any of the aforementioned APIs or protocols, thereby rendering it generic and useable in either network. The interface manager provides the necessary interface between the APIs/protocols in each network and the generic application(s).

BRIEF DESCRIPTION OF THE DRAWINGS

The above and other features and advantages of the present invention are hereinafter described in the following detailed description of illustrative embodiments to be read in conjunction with the accompanying drawings and figures, wherein.

DETAILED DESCRIPTION OF THE INVENTION

Figure 1:
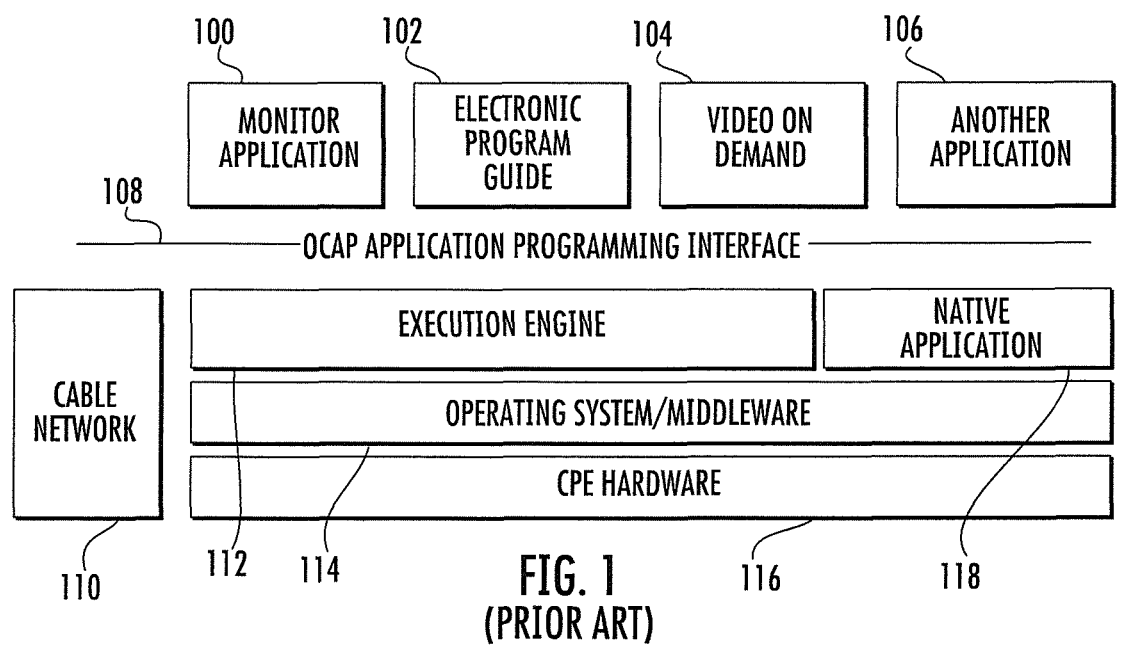
FIG. 1 is an architectural block diagram of exemplary prior art OCAP software, showing in particular that network-specific details of an OCAP implementation are abstracted from the application modules.

Reference is now made to the drawings wherein like numerals refer to like parts throughout.

As used herein, the term "on-demand" or "OD" is meant to include any service that enables real-time, quasi-real time (e.g. "trick" mode delivery) or even non-real time delivery of content such as for example audio and/or video programs at any resolution, or data. Such content may be, for example, stored or temporarily cached on a server, or streamed directly from a source, and may be in response to a user-initiated event, service profile or configuration, head-end event, or otherwise.

As used herein, the term "application" refers generally to a unit of executable software that implements theme-based functionality The themes of applications vary broadly across any number of disciplines and functions (such as e-commerce transactions, brokerage transactions, mortgage interest calculation, home entertainment, gaming, calculator, OD/ITV, etc.), and one application may have more than one theme. The unit of executable software generally runs in a predetermined environment; for example, the unit could comprise a downloadable Java Xlet™ that runs within the JavaTV™ environment.

As used herein, the term "programming interface" refers generally to any type of software interface providing a desired functionality, including but not limited to application programming interfaces (APIs).

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "middleware" refers to software that generally runs primarily at an intermediate layer in a software or protocol stack. For example, middleware may run on top of an operating system and platform hardware, and below applications.

As used herein, the term "DTV Network Provider" refers to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telephony networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO or multiple systems operator) that distributes programming to MSO clientele using client devices. Such programming may include literally any information source/receiver including, inter glia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers such as the Hitachi "VisionPlate", personal communicators such as the Motorola Accompli devices, Motorola EVR-8401, J2ME equipped devices, cellular telephones, or literally any other device capable of interchanging data with a network.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "OpenCable" refers to any of the existing or planned variants of the Opencable specification, an effort that was begun in 1997 by Cable Television Laboratories with a goal of helping the cable industry deploy interactive services over cable. The term includes a set of industry standards, which were introduced to help accomplish this goal via three key objectives to define the next-generation digital consumer device, encourage supplier competition, and create a retail hardware platform. As such, the Opencable project has two key components: a hardware specification and a software specification. The hardware specification allows a receiver that can be sold at retail to provide interoperability. The software specification of the OpenCable project, called the OpenCable Applications Platform (OCAP), solves the problem of proprietary operating system software by creating a common platform upon which interactive services may be deployed. It also refers to similar DTV application standards such as Digital Video Broadcast (DVB) consortium's Multimedia Home Platform (MHP) specification and ITV middleware architecture defined Java TV APIs.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes without limitation such electronic equipment such as set-top boxes, televisions, Digital Video Recorders (DVR), gateway storage devices (Furnace), and ITV Personal Computers.

As used herein, the term "programming interface" refers to a substantially abstracted set of rules, protocols, and/or methods by which applications destined for use in a computer related environment may be designed or modeled. For example, ITV middleware makes use of application programming interfaces (APIs) to define how various applications running on a set-top or host device can be efficiently designed and operated within the set-top OS environment. An API may be, for example, a standardized or commonly agreed-upon set of programming interfaces that can be used by applications to gain access to and execute various functionality within a particular computer system type. This enables, inter alia, interoperable application creation for specific computer system types.

As used herein, the term "server" refers to any computerized component, system or entity regardless of form which is adapted to provide data, files, applications, content, or other services to one or more other devices or entities on a computer network.

Lastly, the term "protocol" refers generally to a predefined set of logical steps or rules which are used to govern the operation of one or more computerized devices, or transfer data or signals to or from such devices. Examples of protocols which may be used in a cable or network environment include without limitation the Session Setup Protocol (SSP), the Lightweight Stream Control Protocol (LSCP), the Real Time Streaming Protocol (RTSP), and the Session Initiation Protocol (SIP).

Overview

The Open Cable Applications Platform (OCAP) is a software programming interface standard that provides a common middleware environment for applications to execute on different types of consumer devices that may be connected to different cable systems. In one salient aspect, the present invention provides apparatus and methods to extend or complement an existing or standard programming interface set for items where the implementation is network-specific. The invention may be useful, for example, with respect to Video On-Demand (VOD) programming interfaces, on-demand session startup interfaces, and conditional access (CA) interfaces, as well as in other applications.

A high level block diagram of an exemplary OCAP software "stack" from the perspective of a host device is shown in FIG. 1. The functional blocks at the top of the stack of FIG. 1 include the "Monitor Application" 100, Electronic Program Guide (EPG) 102, Video-on-Demand Application 104, and any other applications 106 deployed in a particular network. These applications are run on top of a software layer called the "Execution Engine" 108 and interface to the Execution Engine using the well known OCAP APIs 110.

A typical host device will also include certain software applications or "Native Applications" 112 that do not run within the Execution Engine, but directly run on top of the Operating System/Middleware 114 for the host device. Native Applications are typically written for, e.g., a particular hardware configuration of the host device 116 and for stringent interactivity requirements, and are represented by the lowest layer 119 in FIG. 1. Examples of such Native Applications may include management of front panel functionality, remote control interaction, games, and the like.

The details of a particular cable network 110 that are relevant for the software to interoperate are also represented in the exemplary stack of FIG. 1. These "details" 110 comprise a collection of protocols and behavior needed to support a particular cable network including (but not limited to) (i) an application protocol for communicating between application components that are distributed from the host device to other network locations, (ii) a cable network protocol for audio/video and data including application and System Information, and (iii) host support for CableCard interface and host resources.

The present invention is perhaps best understood in the context of the OCAP software specification architecture, although it will be appreciated the invention is by no means limited to this particular context. In a typical OCAP software implementation (FIG. 2), various software modules are used to perform different ITV applications. The modules in the exemplary configuration have been arranged in three groups. The top row 201 of the Figure shows a collection of modules that have no OCAP application access. This includes for example the Executive Module 202, and may also include other modules such as the Closed Captioning Module 203. The Executive Module 202 performs the task of discovering, loading, authenticating and launching the Monitor Application that is provided by network operator to all host devices wanting to attach to the network.

Figure 2:
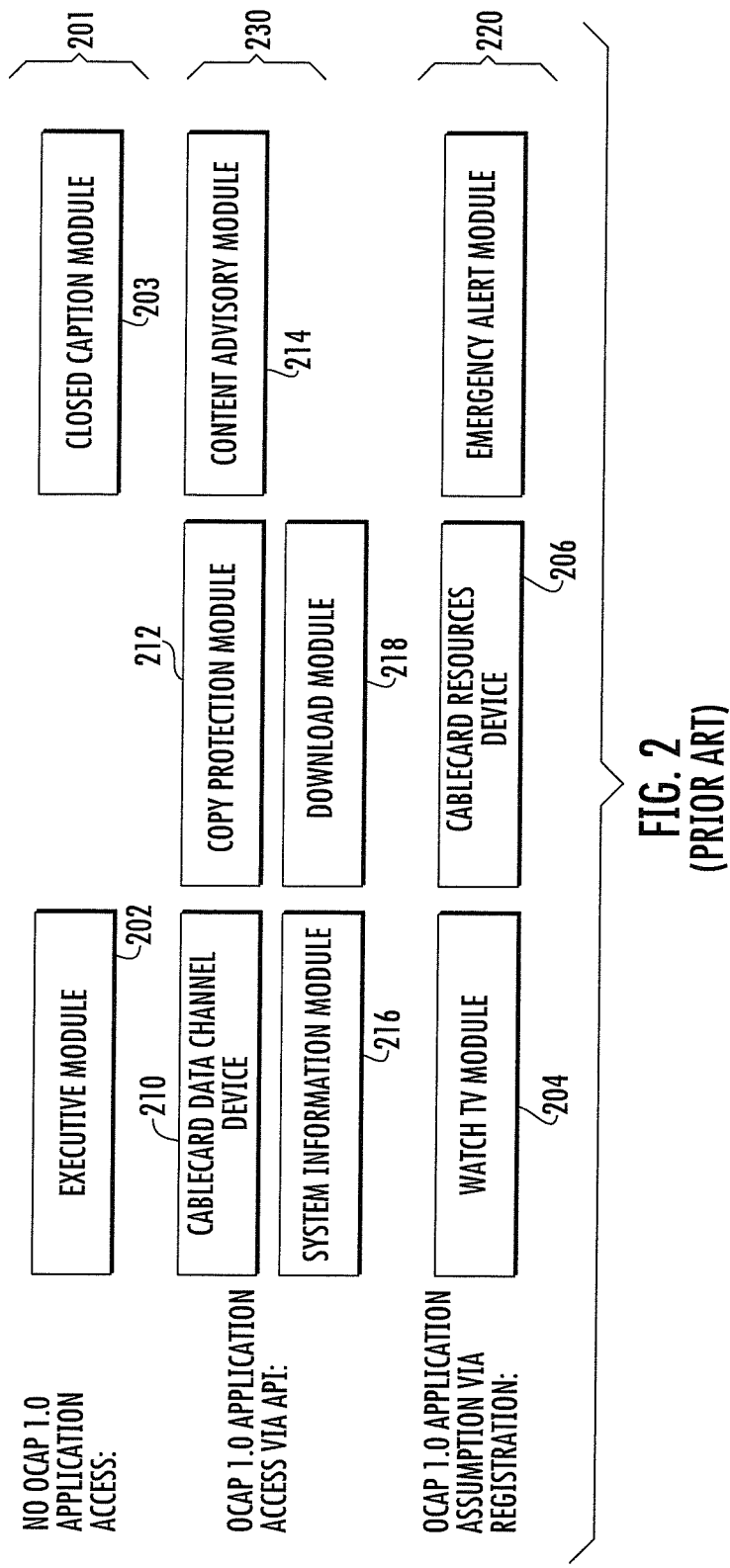
FIG. 2 shows various software modules in a prior art OCAP host device logically arranged in three groups, based on how each module accesses OCAP resources.

A second set of application modules is shown in the bottom row 220 of FIG. 2. These applications share the collective property that they operate by performing registration through the Monitor Application. Examples of this type of module include a Watch-TV application 204 which allows channel changes to view television program, a CableCard Resources Module 206 that allows access to certain CableCard resources, and an Emergency Alert Module 208 that is responsible for processing and displaying any emergency messages present in the incoming signals.

The third set of modules 230 in the illustration of FIG. 2 includes those modules that are given OCAP application access via publishing APIs. Examples of these modules include the CableCard Data Channel Module 210, the Copy Protection Module 212, the Content Advisory Module 214, the System Information Module 216, and the Download Module 218.

The foregoing software modules are generally incorporated in a host device implementation by either the manufacturer of the device, or by cable operator/MSO (e.g., by downloading to the device upon connecting to the network, or loading sometime thereafter). Alternatively, a third-party application developer can incorporate the applications with (in) television programs or out-of-band signals received by the CPE.

The OCAP specification defines steps taken when launching an application, including application authentication, application registration and application persistence. As will be described in greater detail subsequently herein, one exemplary embodiment of the programming interface registration method of the present invention is advantageously designed to use these same steps, therefore minimizing impact on the existing OCAP code base.

According to the OCAP specification, the MSO is responsible for the development, maintenance and delivery of the Monitor Application. The OCAP specification does not require that the Monitor Application be deployed; however there are significant commercial and operational reasons why it should be. Specifically, the Monitor Application uses a set of privileged APIs to manage the lifecycle of unbound OCAP applications. So typically, the Monitor Application will need to be "dual-signed" to provide appropriate permissions as well as for authentication purposes. In addition, it is likely that a large proportion of unbound applications will require digital signature to activate permissions. Examples of the foregoing include persistent storage access, service selection to "own" service, and tuning and applications life cycle management.

A key aspect of OCAP-based host device functionality is the retail availability of these devices. A consumer or other user should be able to obtain such a host device in the retail market or via another channel, and be able to use it successfully to receive cable television programs or services, without having to attend to cable network-specific details, and without having to get assistance from MSO technical support. In other words, the installation and operation as it relates to network-specific aspects should be completely transparent.

The manufacturer of the host device will typically provide all software for the host device needed to perform basic operations. Cable operators are expected to provide a software application (Monitor Software) on their networks that can be used to provide network-specific look and feel to a host device that is connected the cable network. As previously described, software authoring entities developing modules without prior knowledge of which cable network the host device will be deployed in (and hence which network-specific protocols and other requirements that it must be compatible with) must ensure that the module(s) will work uniformly for all cable network protocols. While the software developer can write software that support all possible networks that the retail device might be sold or distributed into, it is both tedious and inefficient, the latter due in large part to the increased resource burden on the host device associated with the "all-purpose" application. Additionally, the software developer simply may not have access to all necessary details of each particular cable network.

A better solution is to offer a common interface between the network-specific protocols and the applications needing to utilize the protocols. This can be achieved for example by a software module or other entity that registers the relevant programming interfaces and in effect advertises them to each application wanting to use these interfaces. One salient benefit of a common API is that it can be shared by multiple applications across networks. A related subtle yet significant benefit is also provided; i.e., a slightly increased "middleware" profile for the host device, yet reductions in size and complexity across all applications by obviating the additional protocols and components specific to each different network. This benefit is magnified where the host device may potentially be introduced into a large number of heterogeneous networks; even a modest code savings for a large number of applications can be quite significant when considered in the aggregate.

Furthermore, such API designs can be made public, or even standardized. For APIs based on communications protocols, the API can be made protocol agnostic if desired, and ported to multiple systems, thereby allowing manufacturers the freedom to determine implementation-specific details. Reusable modules can also be created for registered API use, and integrated into various applications. Such software modules are described in greater detail subsequently herein.

The present invention also addresses the fact that while the CableCard or similar interface is used to abstract a conditional access (CA) system, there may be additional network protocols that require an abstracted API in order to provide true interoperability.

The software "handler" of the present invention allows the implementation of a defined interface within CPE or comparable devices. One exemplary embodiment of the API handler comprises a separate software module that is downloaded or otherwise distributed to the CPE and that will register the implementation of a specific programming interface (e.g., API) with the OCAP stack. Applications will then have the ability to query the OCAP stack to determine if a specific API implementation is available, and then use that interface if it is available. For example, a purchase transaction library could be registered that allows any unbound applications that provide consumer purchase interaction to use the same API to complete purchase transactions with a head-end or other network agent. This not only increases flexibility, but also reduces the overhead associated with the multitude of different applications which may be run on any given CPE within a given network.

In another embodiment, a registered API (including associated class and data files) is delivered with a privileged application. The privileged application registers the API using a modified version thereof. Classes that need to access the registered API must be signaled with an appropriate descriptor (e.g., in the extended application information table (XAIT)). The descriptor contains the name(s) of the API. Each API for which the MSO has granted access must be signaled in this fashion. An application can also query what registered APIs are available, but access to those APIs is granted only when the application is first started.

CPE utilizing the present invention can be made "thinner" if desired in that they require less memory and/or processing capability to service the thinner network-agnostic versions of applications (i.e., those without network specific APIs or protocols entrained therein).

Detailed Description of Exemplary Embodiments

Exemplary embodiments of the methods and apparatus of the invention are now described in detail with reference to FIGS. 3-6. While these exemplary embodiments are described in the context of the aforementioned OpenCable Application Platform (OCAP) Java-based software architecture used in cable networks, the general principles and apparatus of the invention may be extended to other types of software/hardware architectures and networks, whether broadband, narrowband, wired or wireless, or otherwise, the following therefore being merely exemplary in nature. For example, middleware compliant with MHEG or DASE may be employed along with the invention. Myriad other variations are possible.

It will also be appreciated that while described generally in the context of a residential or home ITV application domain, the present invention may be readily adapted to other types of environments (e.g., commercial/enterprise, government/military, etc.) as well.

Furthermore, while described primarily in terms of a downloadable extension module or API, it will be recognized that the present invention may also take other forms, such as being integrated into the protocol stack or middleware of a CPE device at time of manufacture, being disposed within a storage device on or associated with the CPE and selectively installed/removed as needed, or even generated or assembled on-demand (whether at the head-end, another network node, or the CPE itself). Myriad different distribution or delivery paradigms will be readily apparent to those of ordinary skill given the present disclosure.

Figure 3:
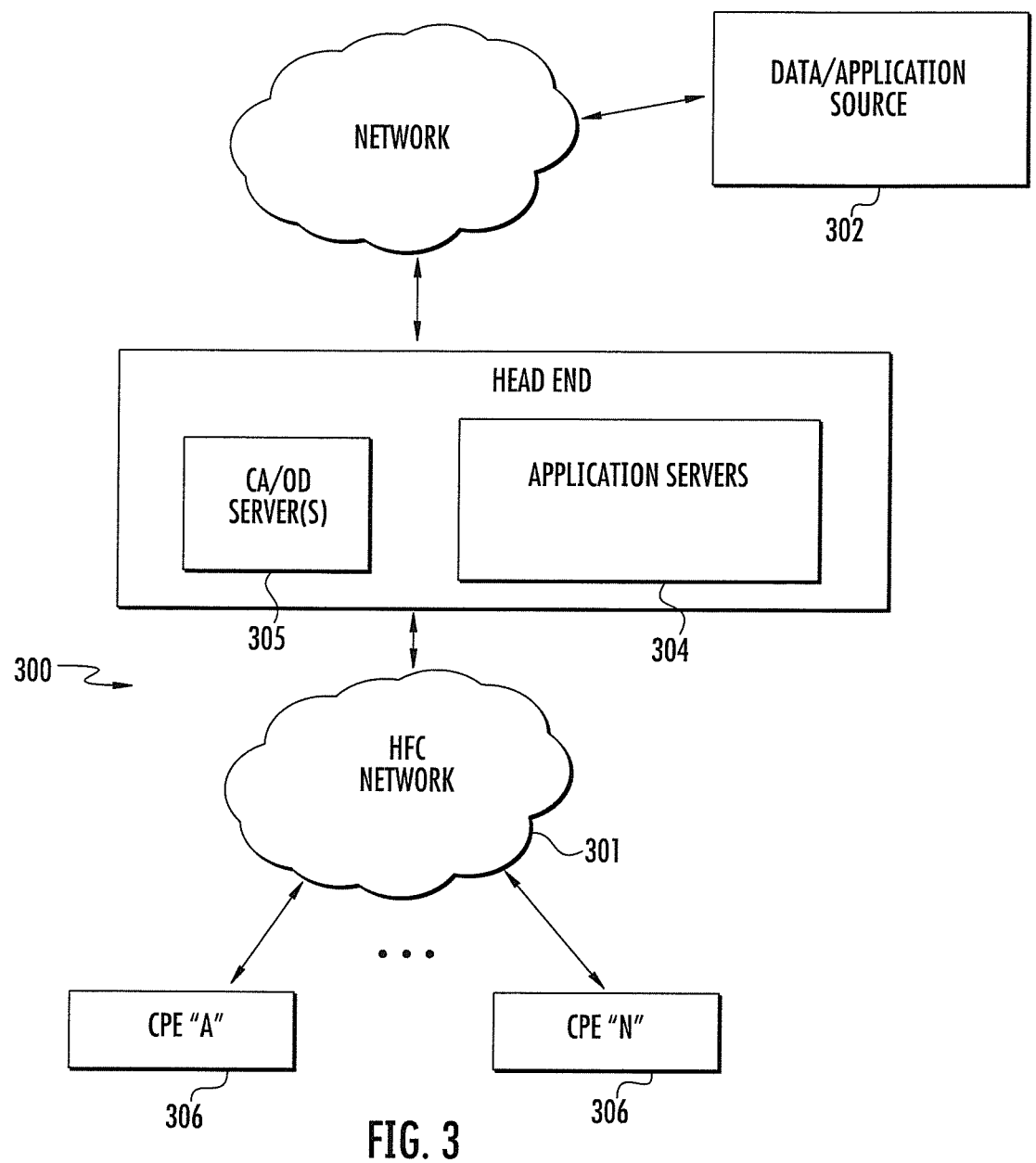
FIG. 3 is a functional block diagram illustrating an exemplary HFC network configuration useful with the present invention.

FIG. 3 illustrates a typical content-based network configuration with which the programming interface management apparatus and methodology of the present invention may be used. The various components of the network 300 include (i) one or more data and application origination points 302; (ii) one or more application distribution servers 304; (iii) one or more VOD servers 305, and (iv) consumer premises equipment (CPE) 306. The distribution server(s) 304, VOD servers 305 and CPE(s) 306 are connected via a bearer (e.g., HFC) network 301. A simple architecture comprising one of each of the aforementioned components 302, 304, 305, 306 is shown in FIG. 3 for simplicity, although it will be recognized that comparable architectures with multiple origination points, distribution servers, VOD servers, and/or CPE devices (as well as different network topologies) may be utilized consistent with the invention. For example, the head-end architecture of FIG. 3a (described in greater detail below) may be used.

The application origination point 302 comprises any medium that allows an application (such as a VOD based application) as well as the downloadable handler module described subsequently herein, to be transferred to a distribution server 304. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 304 comprises a computer system where such applications can enter the network system. Distribution servers are well known in the networking arts, and accordingly not described further herein.

The VOD server 305 a computer system where on-demand content can be received from one or more data sources 302 and enter the network system. These servers may generate the content locally, or alternatively act as a gateway or intermediary from a distant source. The VOD server 305 includes the Session Resource Manager (SRM) functionality, and asks the Digital Network Control System (DNCS) for resources. The DNCS responds with negative or positive response to the request, and the VOD server implements the appropriate resource allocation logic, such as that described in co-pending and co-owned U.S. patent application Ser. No. 10/881,979 filed Jun. 29, 2004 entitled "METHOD AND APPARATUS FOR NETWORK BANDWIDTH ALLOCATION" which is incorporated herein by reference in its entirety. An exemplary VOD server with SRM is described therein as well.

It will be recognized that other topologies of the bearer network may also be used consistent with the present invention, such as for the multi-server architecture described in co-pending and co-owned United States Patent Application Publication No. 20020059619 to Lebar published May 16, 2002 and entitled "Hybrid central/distributed VOD system with tiered content structure", now U.S. Pat. No. 7,690,020, which is incorporated herein by reference in its entirety.

The CPE 306 includes any equipment in the "consumers' premises" (or other locations, whether local or remote to the distribution server 304) that can be accessed by a distribution server 304 or other distribution component. Such CPEs 306 comprise processors and associated computer memory adapted to store and run the downloaded or resident application, as well as receive the streamed in-band content. In the present context, at least a portion of the API handler module is downloaded to the CPE 306, wherein the latter installs and utilizes the downloaded module(s).

Figure 3A:
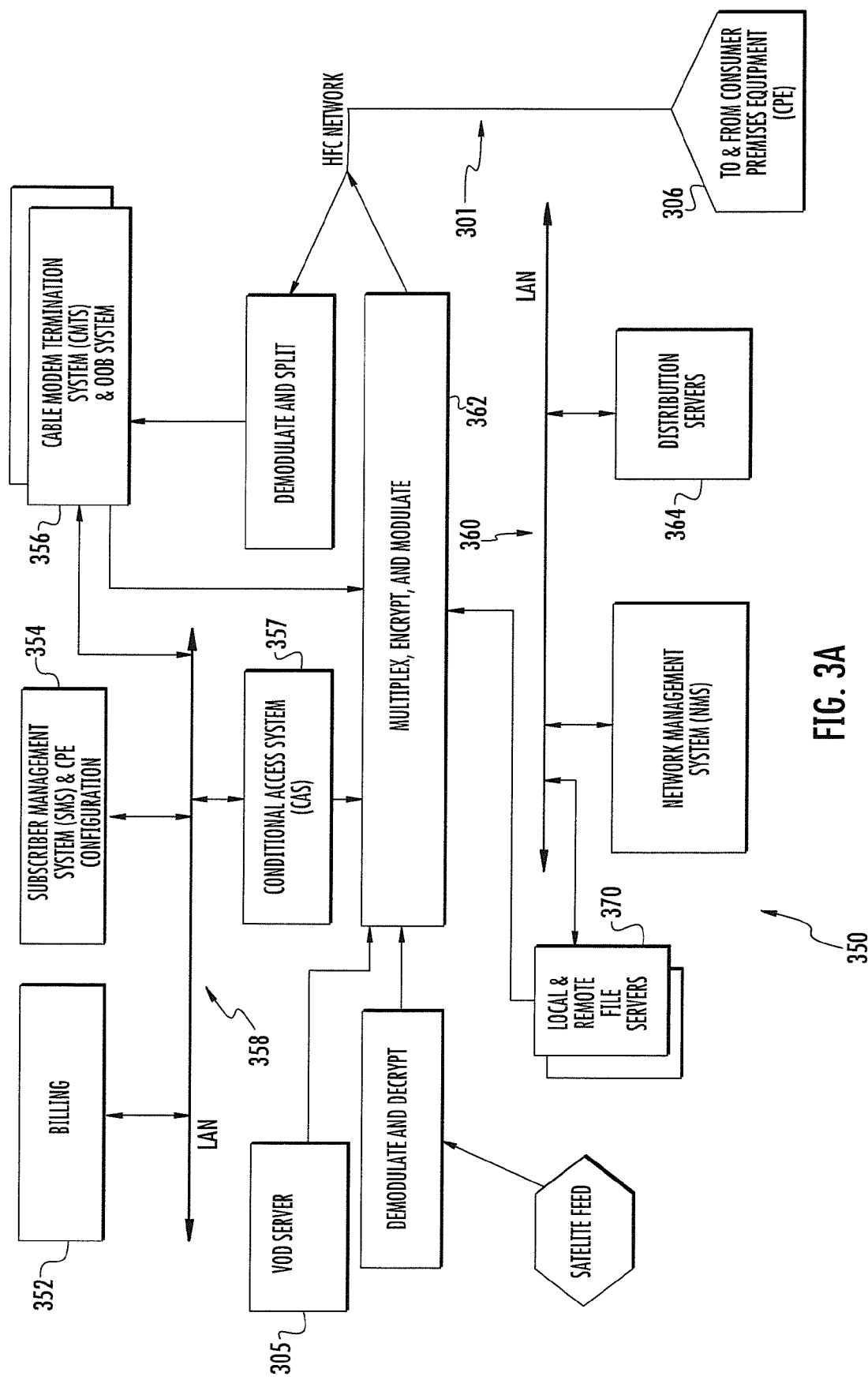
FIG. 3a is a functional block diagram illustrating one exemplary head-end configuration of an HFC network useful with the present invention.

Referring now to FIG. 3a, one exemplary embodiment of a head-end architecture useful with the present invention is described. As shown in FIG. 3a, the head-end architecture 350 comprises typical head-end components and services including billing module 352, subscriber management system (SMS) and CPE configuration management module 354, cable-modem termination system (CMTS) and OOB system 356, as well as LAN(s) 358, 360 placing the various components in data communication with one another. It will be appreciated that while a bar or bus LAN topology is illustrated, any number of other arrangements as previously referenced (e.g., ring, star, etc.) may be used consistent with the invention. Furthermore, the head-end configuration depicted in FIG. 3a is high-level, conceptual architecture and that each MSO may have multiple head-ends deployed using custom architectures.

The architecture 350 of FIG. 3a further includes a multiplexer/encrypter/modulator (MEM) 362 coupled to the HFC network 301 adapted to "condition" content for transmission over the network. In the present context, the distribution servers 304 are coupled to the LAN 360, which provides access to the MEM 362 and network 301 via one or more file servers 370. As previously described, information is carried across multiple channels. Thus, the head-end must be adapted to acquire the information for the carried channels from various sources. Typically, the channels being delivered from the head-end 350 to the CPE 306 ("downstream") are multiplexed together in the head-end and sent to neighborhood hubs (not shown).

Content (e.g., audio, video, etc.) is provided in each downstream (in-band) channel associated with the relevant service group. To communicate with the head-end, the CPE 306 uses the out-of-band (OOB) or DOCSIS channels and associated protocols. The OCAP specification provides for networking protocols both downstream and upstream.

Many other permutations of the foregoing system components and communication methods may also be used consistent with the present invention, as will be recognized by those of ordinary skill in the field.

Interface Manager Module

As described above, one embodiment of the present invention provides inter alia a software module adapted to perform authentication and registration of various APIs within a middleware protocol stack, such that the appropriate programming interface is made available to an application or other entity seeking access to it, and having permission to use it. This approach also contemplates the complete life cycle of such a programming interface; i.e., from creation to ultimate removal from protocol stack.

Figure 4:
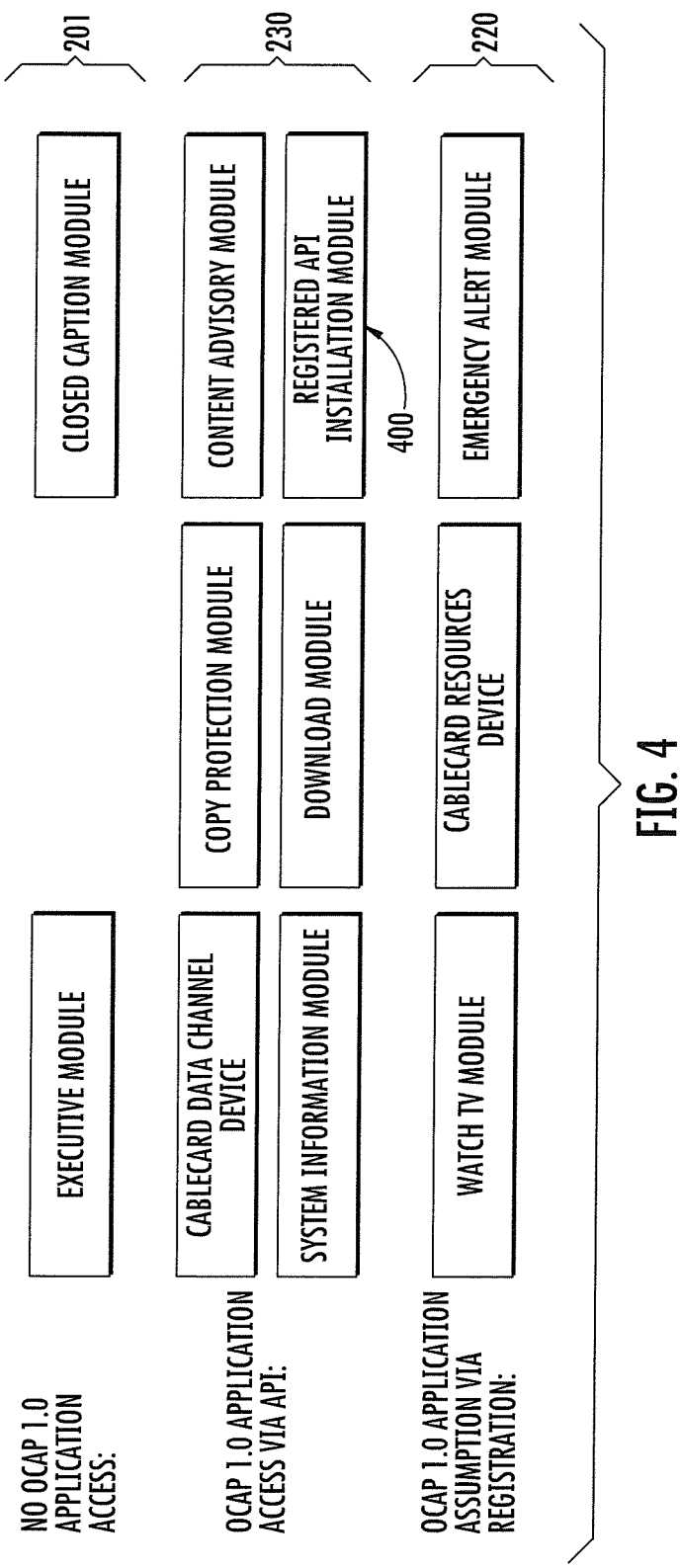
FIG. 4 shows an exemplary software configuration according to the present invention, wherein the API registration module fits within the groups of modules shown in FIG. 2.

Referring now to FIG. 4, an exemplary embodiment of this software module is described in detail. This module 400 (hereinafter referred to as Registered Interface Installation Module or "RIIM") provides a systematic way to abstract network-specific interfaces (e.g., APIs) from applications. Specifically, the RIIM 400 is adapted to perform or facilitate (i) installation of registered APIs; (ii) authentication; (iii) API registration; (iv) API storage; (v) API execution; and (vi) API de-registration/removal of the APIs. Specifically, the exemplary RIIM 400 of FIG. 4 comprises a software module. The RIIM provides the ability for registering and un-registering APIs using standardized and well-understood techniques such as Extended Application Information Tables (XAIT), although other approaches may also be used. In Java or C++, the RIIM can take the form a static singleton object that any application can access, although other forms may also be utilized consistent with the invention.

The RIIM performs registration and manages APIs such that all of the API package elements of a registered API are be available in all application virtual machines (VMs) running on the host device. However, loading of a registered API can be highly implementation specific. The typical trade-off in such cases is between speed and memory; loading all registered APIs regardless of whether another application is using the API will require more run-time memory, but might result in faster software response when applications that use these APIs are launched. Static classes and attributes are, in the illustrated embodiment, made local to each application logical VM. A registered API implementer can use various communication mechanisms such as inter-Xlet communications (IXC) to share objects and primitives. For example, a portal application could register an API and provide IXC objects used by the registered API. IXC handling may be "wrapped up" by a registered API, and applications using the registered API would not need to be aware of IXC registered objects. This approach can substantially simplify IXC object and application upgrades.

Appendix I hereto provides an exemplary class implementation for the OCAP software environment of the API manager function installed by the RIIM 400. The exemplary module 400 is implemented as a class for the org.ocap.system package called RegisteredApiManager, although it will be appreciated that this nomenclature is purely arbitrary. This class contains the methods; register and unregister. The register method is passed a name for the API and an InputStream. The InputStream of the exemplary embodiment is in the form of an XAIT. The XAIT in this case does not represent unbound applications, but instead represents a collection of classes that make up the API being registered. This approach advantageously allows for the authentication of a registered API in the same fashion as that of an application. Descriptor usage for a registered API is somewhat different than for an application, and is described further herein.

In the illustrated embodiment, the RIIM 400 is responsible for authenticating and loading classes that are registered as a registered API by a privileged application. The classes are loaded such that any application launched after the registered API is registered will have access to it. Any static objects or attributes in a registered API are local to the logical VM they were created in. Classes in a registered API may make calls to any implementation API to which it has access to (and for which it has permission). A registered API may also be signed in the same fashion as an application if desired. Every directory in a registered API contains a hash file, in the same fashion as the well-known OCAP-J application. A registered API may also contain a permission request file.

Appendix II shows an exemplary Document Type Definition (DTD) for a Permission Request File that may optionally be associated with a registered API. This exemplary OCAP Permission Request File DTD is configured to extend the DVB-MHP 1.0.2 Permission Request File DTD, since additional permissions have been added to meet OCAP 1.0 requirements. However, in order to be compliant with the DVB-GEM 1.0.0, the OCAP 1.0 PRF DTD includes all elements and attributes of the GEM 1.0 PRF DTD. The OCAP Permission Request File comprises an extensible markup language (XML) file, although it will be apparent that other files types and formats may be used consistent with the invention, the foregoing form and compatibility adaptations being merely illustrative of the broader principles.

The various functional aspects of the exemplary RIIM 400 of FIG. 4 are now described in greater detail.

1. Registration of Registered API Module—In the illustrated embodiment of the module 400, the org.ocap.system-.RegisteredApiManager.register method is used to register a registered API. The exemplary class implementation of Appendix I (OCAP software environment) illustrates the API manager function of the RIIM module. The register method takes a java.io.InputStream parameter, and the InputStream parameter is passed to the org.ocap.system-.RegisteredApiManager.register method in the form of an XAIT. The classes specified by this XAIT represent a group of classes comprising a registered API, not an Xlet. However, a registered API is in the illustrated embodiment signaled in similar fashion to an Xlet, with the exception of certain attributes described below. While use of an Xlet-like signaling paradigm provides certain advantages, it will be appreciated that other signaling methods may be substituted therefor.

Referring to the XAIT fields, a registered API is given an application_dentifier( ) The app_Id portion of this identifier is selected to be unique within the set of registered APIs in the network. The application_control_code and application_type fields are ignored by the RIIM in the illustrated embodiment.

The exemplary XAIT for a registered API contains the following descriptors: (i) a routing descriptor, (ii) a pre-fetch descriptor, and (iii) a DU descriptor, although it will be appreciated that other descriptor architectures (including additional descriptors) may be used if desired. The XAIT for a registered API also contains the application name descriptor; e.g., the name of the registered API.

Transport protocol descriptors specific to the transport of the registered API files are carried in the OCAP-7 application location descriptor. The initial_class_byte field in this descriptor is ignored by the RIIM in the illustrated embodiment.

In terms of the application storage descriptor, the storage_priority field comprises the storage priority of the registered API, and may cause applications already in storage to be removed. The launch_order field is ignored by the exemplary RUM.

Regarding the unbound application descriptor, the version_number field comprises the version of the registered API. The RIIM ignores the service_id field.

Registered API storage—When a registered API is registered, the associated storage_descriptor is checked to determine the storage priority. For storage purposes, a registered API has the same specification as an application that was registered by a privileged application, although other approaches may be substituted.

When the host device detects that it has been moved to a network other than the network where the registered APIs were first registered, these registered APIs associated with the previous network may be removed from persistent storage in order to make room for new APIs associated with the new network. Any number of different techniques for network identification well known to those of ordinary skill can be used consistent with the invention for determining the current network context of the host device, including for example the presence of a different monitor application and/or a different XAIT. Once a new XAIT is delivered to the device, if there is a different version of the registered API signaled in the XAIT, then the old version will be purged and the new version stored, based on the storage priority in the new XAIT.

Additionally, various schemes for removal may be used, including for example (i) complete and unconditional removal of the registered APIs from the previous network; (ii) conditional removal according to one or more criteria (e.g., in order to provide a desired level of persistent storage space); or (iii) removal according to some priority scheme (e.g., largest APIs removed first). Myriad other such approaches may be used.

Registered API Execution—When an application instantiates registered API objects, they are created within the logical virtual machine (VM) of the application that instantiated them. Any threads created by a registered API call are configured to run within the logical virtual machine of the application that performed an action that caused such threads to be spawned.

Registered API Permissions—The methods associated with a registered API may require any of the permissions defined for signed and unsigned applications, as well as those defined by the permission request file. In addition, a registered API may be downloaded with new permissions that may be granted to an application when the SecurityPolicyHandler.getAppPermissions or similar method is called.

Whenever permissions are evaluated, if an application method is in the call stack, the permissions of the application whose method is in the stack are evaluated. Otherwise, the permissions of the registered API are used.

Appendix III hereto provides an exemplary MonitorAppPermission class implementation in the context of an OCAP host device. This implementation illustrates that permission to execute privileged operations should only be granted to the Monitor Application. Since the Monitor Application is a trusted application installed by the network operator or MSO, it is aware of the network-specific APIs and communication protocols that need to be installed on the host device. It will be appreciated, however, that other mechanisms for identifying part or all of the network specific APIs and/or protocols may be used, such as for example using an application or middleware configuration other than a Monitor Application which has explicit knowledge of the APIs/protocols, or non-OCAP proprietary in-band or OOB signaling.

Removal of a Registered API—Whenever the out-of-band (OOB) XAIT privileged_application_descriptor is changed, one or more registered APIs may be unregistered by the implementation as if a privileged application had called the RegisteredApiManager.unregister method. Other removal methods and criteria may be used as well.

It will also be appreciated that the API manager of the illustrated embodiment is compatible with so-called "session handlers" of the type well known in the cable software arts. Such session handlers are used to manage a dynamic service (such as VOD) provided by a service provider in conjunction with a CPE device. This may include for example session set-up, stream control, and teardown. A dynamic service typically comprises a set of privileged content delivered over a finite period of time, such as e.g., the duration of a VOD event. This service may also include an application that provides interaction with consumers during the event, such as an on-screen display that allows the user to make selections, determine start time, etc. Session handlers for services such as VOD and IPPV are typically application specific, and not included in OCAP. However, networks can add this functionality on top of OCAP by delivering it with applications.

A session handler may be implemented using the API manager model (e.g., RIIM 400) or alternatively using merely a set of "implementation" rules as opposed to a separate manager module 400. Hence, the API functionality of the present invention can implemented, inter alia, as a discrete software module, or alternatively as logical functionality implemented by vendors intrinsically within their own products. As an example of the former, a network may have two or more applications that need to use a specific session handler API. Rather than include the session handler API in each application (and waste both network bandwidth for download and memory resources in the CPE that the applications are delivered to), the network downloads the session handler API as a separate API. Alternatively, the latter approach would not require that any module or other entity be downloaded, but rather that each of the software components be adapted at manufacture or distribution to implement the API manager rule set (such as bundling one or more class files with an application at installation or download, as discussed in greater detail subsequently herein).

There are basically three ways this approach can be integrated within an OCAP environment; (i) inter-Xlet communications (IXC); (ii) a registered API; or (iii) or a combination of both (i) and (ii). In the exemplary context of MHP, applications are prohibited from accessing each other's class files and instantiated objects. Instead, the IXC mechanism is utilized. This mechanism allows one application to instantiate an object and register it for other applications to access.

In the context of IXC, the programming interface manager model of the present invention is quite compelling. This stems largely from the fact that every object registered must first be instantiated. The API manager module provides in effect a central access point. Thus, an application providing the session handler API would instantiate the manager and register it. Applications needing to use this API would obtain it from the IXC registry, and access the functionality of the API through the manager module. Once an IXC object is retrieved, other objects from the IXC-providing application can be accessed through that object, rather than obtaining each one from the IXC manager.

Using a registered API, an application can register an entire API. Applications that need to use the API are provided access based on a descriptor signaled with the application. In this case, the entire API is made visible to the accessing application. However, this approach does not provide for shared data between applications, and hence IXC may still need to be used. Note also that IXC can be "wrapped" by a registered API so that accessing applications don't have to contain the capability of performing these functions. Hence, even in this model, an API manager module of the type disclosed herein is advantageous because of the centralized access provided (and the economies associated therewith). It is also completely consistent with the OCAP/Java/object-oriented manager paradigm existing within OCAP systems.

Registered API Mechanism

As an alternative to the Interface or API Manager Module (e.g., RIIM 400) described above, the present invention also provides a mechanism whereby a privileged application can share files or access shared files using a "registered API" mechanism. In essence, applications wishing to share files create an API containing the files and described by a shared classes description file. The API is registered by passing the description file and other information to a system API that allows a privileged application register an API. Applications requiring access to a registered API can be signaled with a new descriptor described herein. As with the prior embodiment, the registered API implementer can use inter-Xlet communications (IXC) to share objects and primitives.

In the exemplary embodiment, a registered API descriptor is used. The descriptor (e.g., ocap_j_registered_api_descriptor) requests that an application be granted access to the shared classes of a registered API. This descriptor can be contained in the application descriptors loop of an XAIT, although other approaches are possible. In the illustrated embodiment, up to 16 of these descriptors may be carried in an application's descriptor loop. If more than 16 instances of this descriptor are present in a single application's descriptor loop, then the device (e.g., CPE) may ignore all instances of this descriptor after the 16th one. Table 1 illustrates the parameters of the exemplary registered API descriptor.

TABLE 1

| Description | No. of Bits | Identifier | Value |
|---|---|---|---|
| ocap_j_registered_api_descriptor( ) { | | | |
|    descriptor_tag | 8 | uimsbf | 0xB1 |
|    descriptor_length | 8 | uimsbf | |
|    for( i=0; i<N; I++ ) { | | | |
|       Registered_api_name_char | 8 | uimsbf | |
|    } | | | |
| } | | | |

Where:
descriptor_tag = Descriptor identifier;
descriptor_length = Number of bytes immediately following the length field; and
registered_api_name_char = One character in a registered API name.

Taken as a whole, these characters represent the registered API name to which the application is requesting access. This string is encoded in the illustrated embodiment using Java's modified UTF-8 encoding, and therefore may not be terminated with a zero byte. The uniqueness of the registered API names should be managed by appending (e.g., prefixing) them with uniquely identifying information, such as with the Internet domain name of the organization providing the registered API, although clearly other schemes for maintaining uniqueness may be utilized.

In the present embodiment, a privileged application is given a number of different capabilities, including the ability to (i) share class files with other applications, (ii) remove shared class files, and/or (iii) access class files that have been shared by another application. Specifically, the disclosed org.ocap.system.RegisteredApiManager class contains methods that let an application share classes with other applications, update shared classes, or remove shared class access from other applications. Application access to shared classes is controlled by MonitorAppPermission ("registeredapi"). The mechanisms and locations for enforcing these access controls are defined in the specification for org.ocap.system.RegisteredApiManager.

To share classes or update shared classes, an application registers an API by passing an API name, version, and "description file" to the implementation. In the illustrated embodiment, DF comprises a Shared Classes Description File (SCDF); the SCDF is in the same format as the Application Description File (ADF) used by the OCAP standards, and specifies the classes that comprise the registered API. It will be recognized, however, that the foregoing DF may be of literally any form compatible with the prevailing software environment.

To remove a registered API, an application passes in the name of the registered API. An application may query information about registered APIs as well. However, under the illustrated embodiment, application access to shared classes can only be modified by application signaling.

An application can be signaled with, e.g., ocap_j_registered_api_deseriptor, in order to access shared classes within a registered API. The ocap_j_registered_api_descriptor contains the name of a registered API to which the application is requesting access.

When installing shared classes, if the storage priority specified when registering an API indicates no storage (or persistent storage has insufficient space), shared classes can be installed in another location that may or may not be volatile, provided such storage is available.

If a given class is listed in both the sharing application's application description file and shared classes description file, and the sharing application is stored, a single copy of the class can be stored. In such case, the higher of the storage priorities indicated by the ocap_j_registered_api_descriptor and application_storage_descriptor is used, although other prioritization schemes can be used if desired.

It is noted that under the illustrated paradigm, a registered API is either completely available (including all classes specified in the SCDF), or it is not available. If the CPE or other host platform deletes part of a registered API, such as for example where the deleted portion was stored in volatile storage and the platform was rebooted), the entire registered API is uninstalled and deleted. In this fashion, the integrity of the registered API is maintained under all circumstances. However, it will be appreciated that other schemes for maintaining "complete" and unadulterated registered APIs can be used, such as where the damaged or incomplete API is diagnosed or inventoried (such as by another software process or module resident on the CPE), and missing components of the API reconstituted or downloaded from an external source.

In order for an application to access a registered API, one or more ocap_j_registered_api_descriptors must appear in the application's descriptor loop in the XAIT; see the discussion of Table 1 above. Any ocap_j_registered_api_descriptors that refer to a registered API not installed at the time the application is loaded are ignored, and such registered APIs are made inaccessible to the application even if they are later installed. However, if the application is destroyed, and then re-launched after the registered APIs are installed, access will be permitted.

In the illustrated embodiment, the shared classes in a registered API are accessed by way of a shared classes classloader. This classloader comprises either (i) a new delegation parent of the application classloader, or (ii) the application classloader. If a new delegation parent is used, it is ideally created before any of the application's classes are loaded, and not created for applications that do not specify any valid descriptors. Furthermore, creation is avoided if none of the registered APIs listed in the descriptors (e.g., ocap_j_registered_api_descriptors) are installed.

Where the shared classes classloader comprises the application classloader (option (ii) above), the base directory for each registered API is pre-pended to the application's classpath. In one variant, the base directory is pre-pended in the order that the ocap_j_registered_api_descriptors appear in the descriptor loop, although other approaches may be used. Similarly, where the shared classes classloader is a new delegation parent of the application classloader (option (i)), the classpath for that new delegation parent comprises the base directories for each registered API in the order that the ocap_j_registered_api_descriptors appear within the XAIT descriptor loop.

The base directory for shared classes is made inaccessible to applications other than via the ClassLoader (e.g., the ClassLoader.loadClass( ), getResource( ), and getResourceAsStream( ) methods). The ClassLoadergetResource( ) method is accessible for resources loaded from a registered API, and the resource returned by the method is readable in the usual way. The ClassLoader.getResource( ) method can be configured to return a universal resource locator (URL) using the file. In this case, the application is configured to read that file using java.io or a comparable mechanism, but is precluded from writing to the file.

In the present embodiment, access to shared class files is denied before they have been installed. Applications attempting to instantiate an object instance of a shared class are notified accordingly, such as for example being thrown a java.lang.ClassNotFoundException if the shared class has not been installed, or a class with the same name was not included with the requesting application. A shared class file may not have been installed for any number of reasons, such as because no application attempted to install it, the class could not be authenticated, or either the installing or accessing application does not have MonitorAppPermission ("registeredapi").

Once one or more shared classes have been installed, they can be accessed even after the installing application has been destroyed. As will be appreciated by those of ordinary skill, those shared classes which have been installed in persistent or non-volatile storage will be accessible after a reboot or power-cycle, while those installed to volatile storage only will not be accessible after a reboot or power-cycle.

When the CPE/host device is moved to a different network, the illustrated embodiment of the invention removes those registered APIs registered prior to the move. This is performed to make space for new APIs (such as those associated with the new host network). Shared classes are also removed from persistent storage in the same fashion as application files. In addition, any application with MonitorAppPermission ("registeredapi") can be configured to remove a registered API using the org.ocap.system.RegisteredApiManager singleton. It will be appreciated, however, that removal of a registered API can adversely affect those applications accessing shared classes within the API.

In terms of updates, an application can update a registered API by simply attempting to register an API with the same name as an application already registered.

In order to preserve security, the shared class files can be authenticated with the applications that access them. This approach requires that the class files be signed by the same keys as the main class of the application that uses them, or alternatively that they are dual-signed as is well known in the encryption arts. If neither of these conditions are met, then the signature check performed when the application tries to use the class files will be failed. In the illustrated embodiment, the SCDF is configured to contain the certificate, signature, and hash files needed to authenticate any shared files, although other approaches may be used.

It will be appreciated that shared classes indicated by a description file (e.g., SCDF) might not need to be authenticated with the application that registers the corresponding API. This situation can occur when the sharing application is signaled with an application description file that does not contain any of the shared classes specified by the SCDF. However, the CPE may be configured to check that shared classes are dual-signed (and the installation fail if they are not).

When shared classes are accessed by an application signaled with the ocap_j_registered_api_descriptor, the classes are granted the same permissions as the application.

Note that in the exemplary embodiment, described herein, there is no package "sealing" for registered APIs. Applications may define classes in the package(s) used by the registered API, allowing them to access package-private members of registered API classes according to normal Java rules.

Methods of Operation

Figure 5:
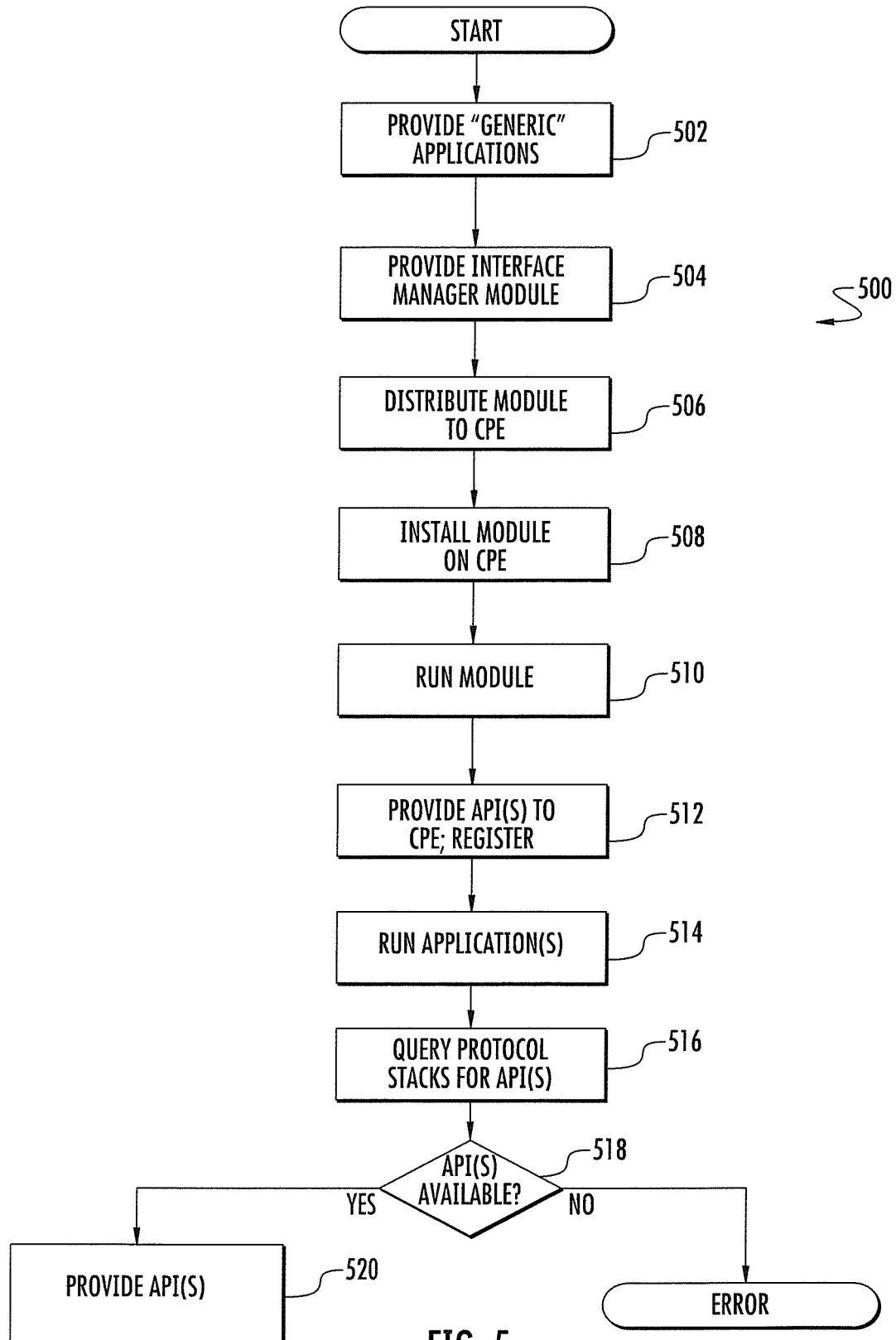
FIG. 5 is a logical flow diagram illustrating one exemplary embodiment of the method of operating a network device (e.g., CPE) using the programming interface manager of the present invention.

FIG. 5 graphically illustrates an exemplary method of operating CPE within a cable network using the programming interface functionality previously described herein, specifically the module architecture of FIG. 4.

As shown in FIG. 5, the method comprises first providing one or more applications that may conceivably be used within a plurality of different networks (step 502). As previously discussed, these applications are not required to be developed or written based on any network-specific protocol, and in fact may be completely network agnostic.

Per step 504, a handler or manager module or entity such as the exemplary RIIM 400 described above is developed and prepared for use in the network. Such handler modules may be developed using any number of techniques known to those of ordinary skill in the programming arts, which accordingly are not described further herein. Key attributes of the module include the ability to register, install and manage APIs needed by the various applications of step 502. Note that the application(s) provided in step 502 above may be developed in view of (i.e., to be compatible with) an existing or even standardized handler module, thereby in effect guaranteeing compatibility of the application with the module and the CPE or other device on which the application is ultimately run.

The handler module is next distributed to the host device (e.g., set-top CPE) of the end user (step 506). In one embodiment, the handler module is downloaded from the network via in-band channel by the CPE and stored for immediate or subsequent installation. The module may be provided using any number of other mechanisms, however, including for example: (i) download via an OOB channel, whether in request to an OOB "pull" from the CPE or otherwise; (ii) within the software/middleware package installed on or provided with the CPE at time of purchase; (iii) upon initial installation of the CPE by the MSO (or pursuant to a user self-installation; (iv) from an MSO, manufacturer, or third-party website or FTP server; (v) via a physical medium such as a CD-ROM, USB key, flash device, or floppy disk; or (vi) via another interface on the CPE, such as the IEEE-1394 "Firewire" interface or IEEE-802.11 or 802.15 wireless interface.

After installation of the handler module (step 508), the module is then run on the CPE (step 510). As previously described with respect to FIG. 4, the handler module acts as somewhat of an abstract "universal interface" between the applications and the specific protocols of the particular network in which the CPE is installed.

Next, in step 512, one or more programming interfaces (e.g., APIs) are provided to the CPE (such as via any of the foregoing mechanisms associated with the API manager module) and registered with the handler module 400 (and hence the OCAP stack) using for example the methods of Appendices I-III. In this fashion, these APIs are available to all applications having suitable permissions via the OCAP stack. This obviates each application having to be developed with the particular APIs required for each specific network.

Next, in step 514, one or more applications are launched on the CPE. After launch, the application queries the protocol stack (step 516) to determine if one or more required APIs are accessible. If the requested APIs are accessible (step 518), access to the API(s) is/are provided per step 520 assuming that appropriate permissions exist for that application. In the exemplary Java-based embodiment, the APIs are instantiated in the relevant Java VMs.

It will be recognized by those of ordinary skill that using the method of FIG. 5, it is further possible to provide (e.g., download) and register a non-standard API extension handler. A non-standard API extension is an interface that has not completed the standards process (and thus the interface may or may not be available on a standard OCAP device), but is otherwise required to encapsulate specific functionality and make it available across multiple applications.

Figure 5A:
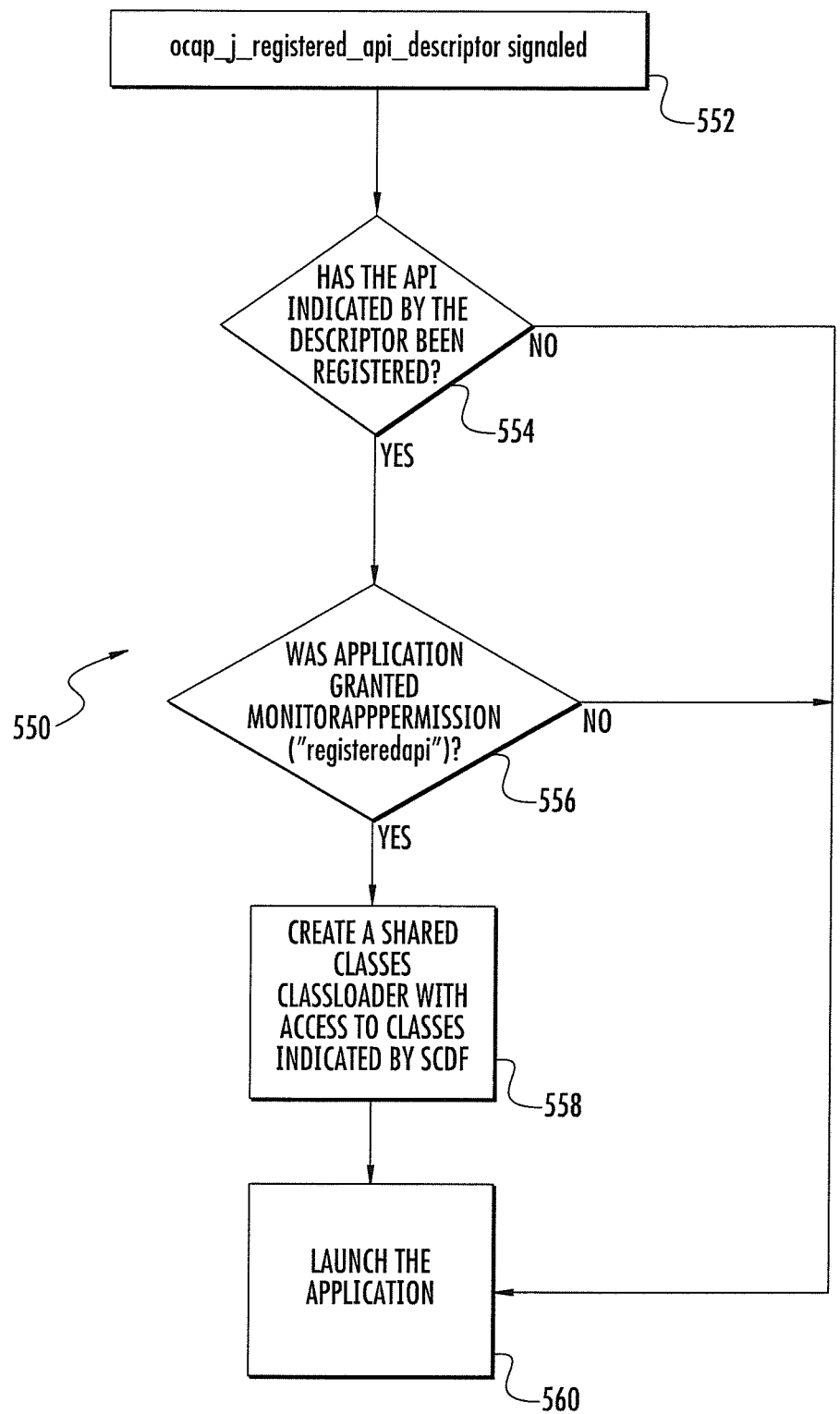
FIG. 5a is a logical flow diagram illustrating another exemplary embodiment of the method of operating a network device (e.g., CPE), including descriptor signaling and generation of the shared classes classloader.

Alternatively, the "registered API" approach previously described herein is employed; see FIG. 5a. Specifically, class and data files associated with the API functionality are downloaded along with an application (e.g., a double-signed application with MonitorAppPermission ("registeredapi")), as opposed to downloading a registered API as a separate entity as with the RIIM module approach. This downloaded application registers the API using a modified version of the API; e.g., by calling the Register method and passing in a description file (DF) or other entity. The DF describes the class and data files provided with the application that are part of the registered API. For security purposes, the downloaded application also passes in a name associated with the API, the name being used for inter cilia, looking up the API. The descriptor that is sent with those applications requiring access the registered API contains this name.

As shown in the method 550 of FIG. 5a, an ocap_j_registered_api_descriptor is first signaled with an application (step 552). Next, the API signaled by the descriptor is evaluated to determine if it has been registered (step 554); if so, the status of the permission(s) granted to the relevant application is determined per step 556. If permission has been granted, a shared classes classloader is next created (step 558), the classloader having access to the classes listed in the description file (e.g., SCDF). The application is then launched per step 560.

Appendices IV-VI provide exemplary code for implementing the registered API functionality referenced above.

Exemplary CPE

Figure 6:
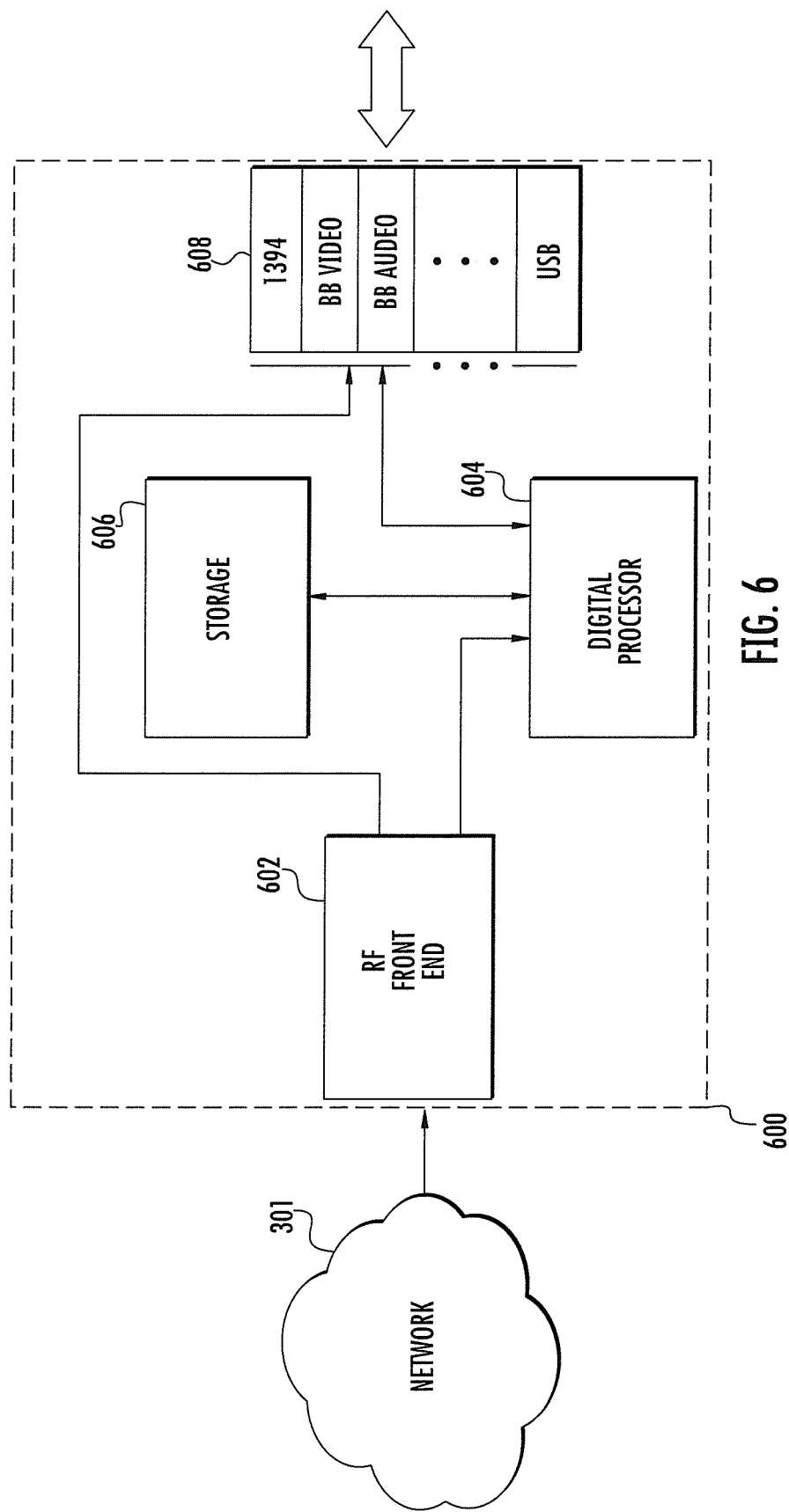
FIG. 6 is a functional block diagram illustrating one exemplary embodiment of network CPE adapted for use with the programming interface manager of the invention.
Figure 6A:
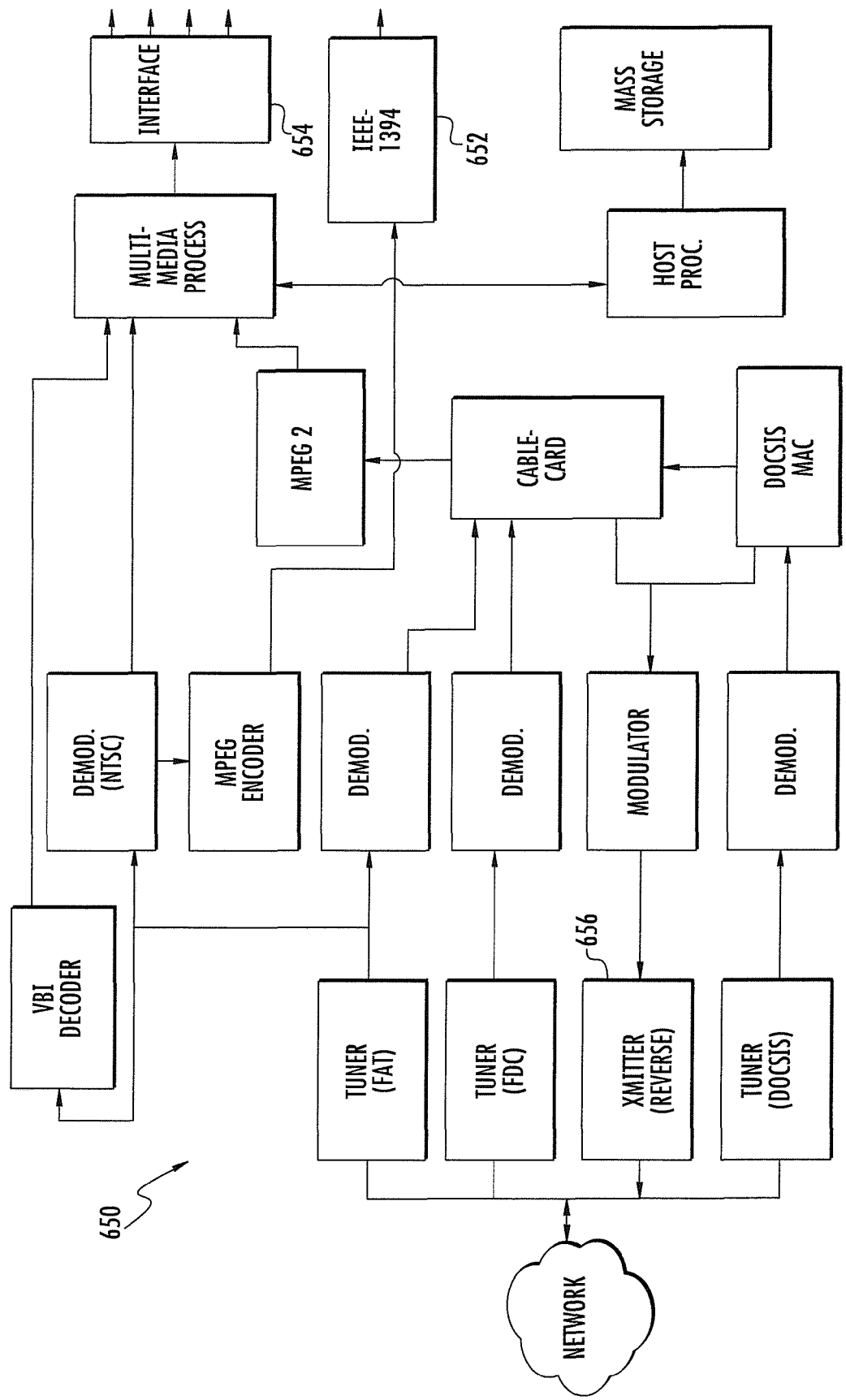
FIG. 6a is a functional block diagram illustrating another exemplary embodiment of network CPE being specifically configured for operation in an OCAP network.

Referring now to FIGS. 6 and 6a, various embodiments of the improved electronic device with "abstracted" programming interface capability according to the present invention is described. As shown in FIG. 6, the device 600 generally comprises an embedded CPE 306 having an RF front end 602 (including modulator/demodulator) for interface with the HFC network 301 of FIG. 3, digital processor(s) 604, storage device 606, and a plurality of interfaces 608 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 6 for simplicity) include RF tuner stages, various processing layers (e.g., DOCSIS MAC, OOB channels, MPEG, etc.) as well as media processors and other specialized SoC or ASIC devices. These additional components and functionality are well known to those of ordinary skill in the cable and embedded system fields, and accordingly not described further herein.

FIG. 6a illustrates an exemplary OCAP-compliant device 650; i.e., which adheres to the advanced profile defined by the OpenCable Core Function Requirements (CFR) specification OC-SP-HOST-CFR-I16-040402. As shown in FIG. 6a, only the IEEE-1394 652 and audio/video interfaces 654 are required. This approach is intentional; device makers are in effect forced to use the cable input for various functions (such as, e.g., guide data acquisition) which are proprietary and can only be read by an MSO application. A DOCSIS/DAVIC transmitter 656 is also included for communication with the head-end. This enables two-way traffic via the reverse channel. Also, a DOCSIS Service Gateway (DSG) is included; this enables the CPE 650 to switch between DAVIC and DOCSIS based on preferred network signaling from the head-end.

The exemplary devices 600, 650 of FIGS. 6 and 6a are also provided with a software architecture of the type previously described herein, including an OCAP-compliant monitor application and Java-based middleware which, inter alia, manages the operation of the device and applications running thereon, including implementing the download, application launch, and path configuration for network specific protocols as set forth above. The software architecture of the device 600, 650 is adapted to receive (whether by download or otherwise) the interface manager module (e.g., RIIM 400), install it, and utilize it to manage APIs as previously described with respect to FIG. 4 (or alternatively receive the class files with the downloaded application, and pass in the DF and name). It will be recognized by those of ordinary skill that myriad different device and software architectures may be used consistent with the invention, the CPE devices of FIGS. 6 and 6a being merely exemplary. For example, different middlewares (e.g., MHEG, or DASE) may be used in place of the OCAP middleware of the illustrated embodiment. Alternatively, the device may comprises a wireless device coupled to the network via a wireless link (e.g., 802.11, Bluetooth, 3G, or even 802.15 UWB) of sufficient data bandwidth.

It will also be appreciated that the devices 600, 650 of FIGS. 6 and 6a respectively may be integrated with other device of components, whether related to the content-based network over which the ITV or on-demand services are provided or otherwise. For example, the device may be integrated with an MHP-compliant satellite receiver unit of the type well known in the art. The CPE device may also be integrated with a display device as well or in the alternative, so as to provide an "all-in-one" type form factor to the consumer.

The interface manager and associated techniques of the present invention can also advantageously be used in conjunction with (and without interfering with) other functions resident in the CPE, such as for example the hardware registry described in co-owned U.S. patent application Ser. No. 10/723,959 filed Nov. 24, 2003 and entitled "METHODS AND APPARATUS FOR HARDWARE REGISTRATION IN A NETWORK DEVICE", now issued as U.S. Pat. No. 8,302,111 the error logging functionality described in co-owned U.S. patent application Ser. No. 10/722,206 filed Nov. 24, 2003 and entitled "METHODS AND APPARATUS FOR EVENT LOGGING IN AN INFORMATION NETWORK", now U.S. Pat. No. 7,266,726, and the display element management functionality described in co-owned and co-pending U.S. patent application Ser. No. 10/773,664 filed Feb. 6, 2004 and entitled "METHODS AND APPARATUS FOR DISPLAY ELEMENT MANAGEMENT IN AN INFORMATION NETWORK", each incorporated herein by reference in their entirety. For example, events or errors generated through access or manipulation of VOD or ITV applications which utilize APIs registered with the API manager module can be logged within the aforementioned error logging system for later use or analysis. As another alternative, API manager module download and/or application launch can be predicated upon notification from the hardware registry that sufficient hardware or resources is/are present to support the interface manager module or application on the CPE. Similarly, the aforementioned display element (e.g., window) manager can be adapted to include display elements or other functionality relating to the installation, operation or removal of the API manager module, class files, DF or APIs. Myriad other possible uses and interactions between the various inventions are also possible, as will be appreciated by those of ordinary skill.

Business Methods

Figure 7:
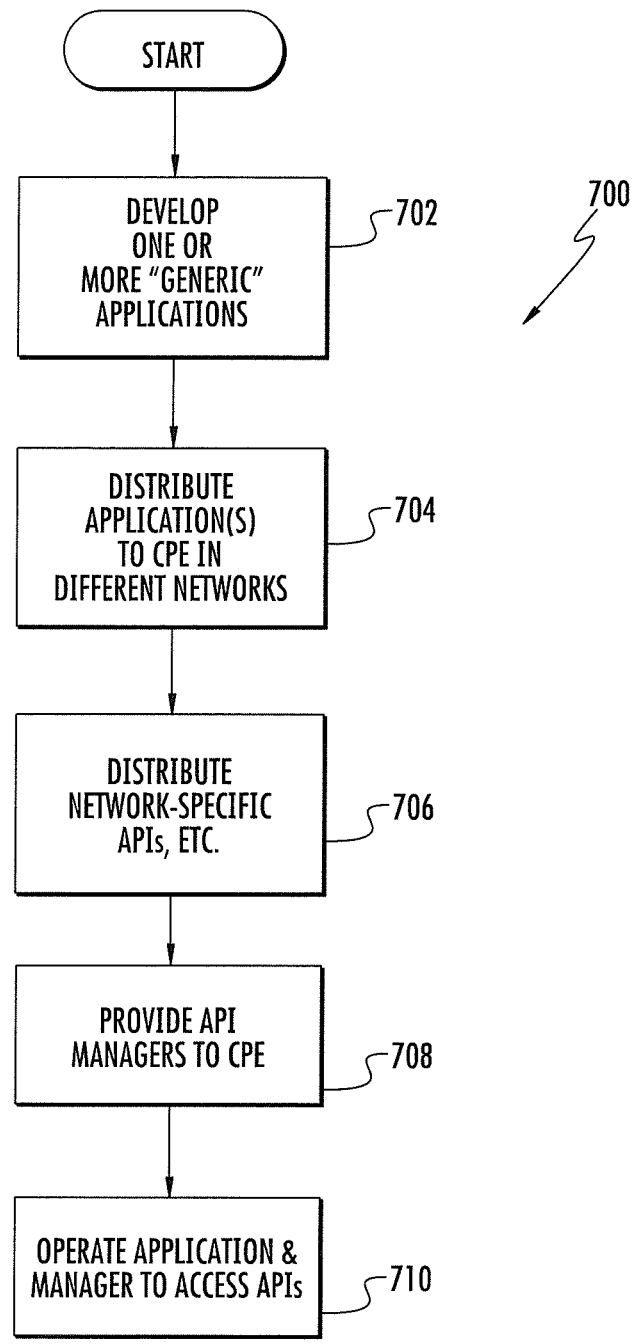
FIG. 7 is a logical flow diagram illustrating one exemplary embodiment of the method of utilizing one or more generic applications within a plurality of heterogeneous networks.

Referring now to FIG. 7, another aspect of the invention is described in detail. Specifically, a method of operating first and second networks so as to be able to use a common application in both is described.

As shown in FIG. 7, the method 700 generally comprises first developing two or more substantially identical versions of an application from which most or all of the network-specific functionality has been abstracted (step 702). One application may be developed and copied multiple times, or multiple closely-related applications developed, etc. By making the applications as similar as possible (including abstraction of all network-specific functionality such as APIs and protocols), the applications can in effect be made generic across all networks that a given MSO or owner operates. Per step 704, these applications are distributed to client devices in each of the networks, such as via direct download, physical media, installation at time of manufacture, etc.

Additionally, the network-specific functional entities (e.g., APIs) are distributed to the client devices within the networks using similar means (step 706). These functional entities are each adapted to provide the network-specific functionality (e.g., on-demand, conditional access, etc.) relevant to the network in which the CPE is installed.

An entity manager is also provided to the client devices of the networks (step 708). As previously described herein, the entity manager may comprise an API manager adapted to interface with the application(s) and the relevant functional entities (APIs and protocols), or alternatively the set of class files and functionalities provided with the application at download.

Per step 710, the "generic" applications are operated on the client devices of the different networks, with the applications and manager/class files of the client devices within each network cooperating to access the network-specific APIs and/or protocols as required.

Hence, using the method of FIG. 7, the network operator can develop, maintain and distribute only one generic version of an application (as opposed to multiple network specific versions), thereby reducing their cost and management burden for distributing the proper version of an application to its particular network(s). This also provides benefits when upgrades, patches, or updates to applications must be distributed, since only one update/patch/upgrade need be distributed to all networks, as opposed to different ones to each individual network.

Additionally, client devices used in these networks can be "thinner", since the several generic applications installed on each client device are (in the aggregate) necessarily simpler and less resource intensive, a benefit which significantly outweighs the added overhead associated with the interface manager module(s).

Various business models can also be employed consistent with the method of FIG. 7. For example, in one variant, the generic application(s) is/are developed by the MSO or a third party developer, and provided to the user as part of a subscription, as an incentive, or even anecdotally as part or promotionals or even on-demand or other premium service sessions.

Similarly, the API manager can be included within the CPE at time of manufacture, downloaded as part of a subscription, etc., selectively distributed as a feature or incentive (e.g., to premium customers), and the like. The API manager may also be configured to lie "dormant" within the CPE until it is needed, at which point it can be run and installed.

The APIs or other functional entities necessary to operate the applications within the given network can also be bundled with the manager module or class files/DF at distribution (such as via a common downloaded file), installed separately (such as during installation or startup of the CPE within its home network), provided via a third party via website or media, provided at time of on-demand or similar session request/initiation, or any number of other possibilities.

In one exemplary variant, an improved on-demand session handling approach is provided. For on-demand services such as VOD, session management is specific to the servers purchased by the head-end. Specific protocols may be utilized, such as for example the well-known DSM-CC and RTSP protocols. A session manager API is created that abstracts out the protocols, and provides a consistent application interface across literally any system. Similarly, this approach can be adapted to any e-commerce interface, including without limitation so-called impulse pay-per-view (IPPV) systems.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of operating a consumer electronics device having a software environment and a plurality of applications, each of said plurality of applications being precluded from accessing files or instantiated objects of other ones of said plurality of applications, comprising:
    downloading an entity configured to manage at least one session, said entity further configured to be utilized with respect to multiple ones of said plurality of applications;
    registering said entity in a content delivery network;
    running at least two of said plurality of applications on said consumer electronics device;
    based at least in part on said registration, accessing said entity with said at least two applications; and
    upon detection that said consumer electronic device has moved to a network other than said content delivery network, unregistering and removing said registered entity from said consumer electronics device;
    wherein a plurality of network-specific data is shared by said at least two applications, said plurality of network-specific data being made accessible to said at least two applications by an application programming interface (API), said shared plurality of network-specific data enabling said at least two applications to communicate with a network entity of said content delivery network via a protocol of said shared plurality of network-specific data.

2. The method of claim 1, wherein:
    the software environment comprises a Java-based environment;
    the entity comprises a session handler API; and
    the application programming interface (API) comprises the session handler API.

3. The method of claim 2, wherein said plurality of data comprises data used by said session handler API.

4. The method of claim 2, wherein said plurality of data comprises inter-Xlet communications (IXC) data.

5. The method of claim 1, said method further comprising:
    detecting if said consumer electronics device has changed content delivery networks; and
    when said change in content delivery networks has been detected, unregistering said entity.

6. The method of claim 5, said method further comprising deleting said unregistered entity from said consumer electronics device.

7. The method of claim 1, further comprising, based, at least in part, on said determination that said portion of said entity has been deleted, delete said entity from said consumer electronics device.

8. The method of claim 1, further comprising, based, at least in part, on said determination that said portion of said entity has been deleted, reconstituting said entity from an external source.

9. Reduced-profile consumer premise equipment (CPE) configured to couple to a content delivery network, said CPE comprising:
    at least one network interface;
    a storage apparatus;
    a processor configured to execute at least one computer program thereon, said computer program comprising a plurality of instructions configured to, when executed by said processor, cause said CPE to:
        download and register at least one network-specific application programming interface (API), said at least one network-specific API comprising data to be shared among a plurality of applications stored on said storage apparatus and operative to be executed by said processor; and
        provide access to said data via said at least one network-specific API by said plurality of network-agnostic applications, said access configured to permit said plurality network-agnostic applications to communicate with a network entity of said content delivery network via said network-specific protocol of said at least one API; and
    an interface manager comprising a downloadable module adapted to selectively register and de-register said API with a registry entity associated with said CPE, said interface manager configured to de-register said at least one network-specific API upon a detection of a change in a content delivery network.

10. The CPE of claim 9, further comprising a session manager, said session manager being adapted to control operation of an interactive session on said consumer electronics, said session comprising execution of at least one of said plurality of network-agnostic applications.

11. The CPE of claim 9, wherein said data comprises inter-Xlet communications (IXC) data for use by said API when said plurality of applications are run.

12. The CPE of claim 9, wherein said interface manager is configured delete said at least one network-specific API.

13. The CPE of claim 9, wherein said access is only provided to individual ones of said plurality of network-agnostic applications upon a determination said individual ones has permission to access said data via said at least one network-specific API.

14. A consumer premise equipment (CPE) adapted for use in a content delivery network, said CPE comprising:
    a storage apparatus having stored thereon a plurality of software applications each being intentionally devoid of all network-specific programming interfaces and network-specific protocols;
    at least one network-specific programming interface; and
    at least one manager entity, said manager entity being adapted to run within a same software environment as said at least one network-specific programming interface and said plurality of software applications, said manager entity configured to:
        register said at least one network-specific programming interface;
        enable individual ones of said plurality of software applications to access said at least one network-specific programming interface; and
        authenticate said individual ones of said plurality of software applications via a digital signature to provide appropriate permissions for said access to said at least one network-specific programming interface;

wherein a plurality of data is utilized by said network-specific programming interface and shared by said plurality of software applications, said plurality of data configured to enable said plurality of software applications to communicate with an entity of said content delivery network via a protocol of said at least one network-specific programming interface; and wherein each of said individual ones of said plurality of software applications is represented by a descriptor, an said CPE is configured to consider only a prescribed number of said descriptors.

15. The CPE of claim 14, wherein said software environment comprises an object-oriented environment.

16. The CPE of claim 15, wherein said object-oriented environment comprises a Java-based environment.

17. The CPE of claim 16, wherein at least one of said plurality of software applications comprises at least one of an on-demand and/or conditional access application.

18. The CPE of claim 14, further comprising a session handler module, said session handler module being adapted to inter-operate with said plurality of software applications.

19. The CPE of claim 14, wherein said entity comprises a Video On-Demand (VOD) server.

20. The CPE of claim 14, wherein said plurality of data is only shared to individual ones of said plurality of software applications upon a determination that said individuals ones have suitable permissions.

21. A reduced-profile consumer premise equipment (CPE) adapted for use in a managed content delivery network, said CPE comprising:

a storage apparatus having stored thereon a plurality of thin software applications each being developed by an application developer such that no network-specific programming interfaces and network-specific protocols are contained therein;

at least one network-specific programming interface; and at least one manager entity, said manager entity being adapted to run within a same software environment as said at least one network-specific programming interface and said plurality of software applications, said manager entity configured to:
register said at least one network-specific programming interface;
enable individual ones of said plurality of software applications to access said at least one network-specific programming interface; and
authenticate said individual ones of said plurality of software applications for said access to said at least one network-specific programming interface;

wherein a plurality of data is utilized by said network-specific programming interface and shared by said plurality of software applications, said plurality of data configured to enable said plurality of software applications to communicate with an entity of said content delivery network via a protocol of said at least one network-specific programming interface;

wherein said reduced profile of said CPE comprises a reduction at least in processing capability as compared to a CPE not configured to utilize said thin software applications; and wherein each of said individual ones of said plurality of software applications is represented by a descriptor, an said CPE is configured to consider only a prescribed number of said descriptors.

* * * * *